United States Patent
Wilkens

(10) Patent No.: US 9,630,717 B2
(45) Date of Patent: Apr. 25, 2017

(54) AIRCRAFT SEATING ASSEMBLY WITH REDUCED SPACING

(71) Applicant: Encore Interiors, Inc., Irvine, CA (US)

(72) Inventor: Jeremy Wilkens, Newport Beach, CA (US)

(73) Assignee: Encore Interiors, Inc., Irvine, CA (US)

( * ) Notice: Subject to any disclaimer, the term of this patent is extended or adjusted under 35 U.S.C. 154(b) by 0 days.

(21) Appl. No.: 14/245,892

(22) Filed: Apr. 4, 2014

(65) Prior Publication Data
US 2014/0333100 A1 Nov. 13, 2014

Related U.S. Application Data

(63) Continuation-in-part of application No. 29/464,754, filed on Aug. 20, 2013, now Pat. No. Des. 750,392.

(60) Provisional application No. 61/816,652, filed on Apr. 26, 2013.

(51) Int. Cl.
*B64D 11/00* (2006.01)
*B64D 11/06* (2006.01)

(52) U.S. Cl.
CPC .... *B64D 11/00151* (2014.12); *B64D 11/0638* (2014.12); *B64D 11/0644* (2014.12); *Y02T 50/46* (2013.01)

(58) Field of Classification Search
CPC .............. B64D 11/06; B64D 11/00151; B64D 11/0644; B64D 11/0638; Y02T 50/46
USPC ... 297/411.32, 115, 411.3, 248, 113, 452.18, 297/217.4; 244/118.6
See application file for complete search history.

(56) References Cited

U.S. PATENT DOCUMENTS

| | | | |
|---|---|---|---|
| 345,710 A | 7/1886 | Mason |
| 2,619,395 A | 11/1952 | Kent |
| D180,710 S | 7/1957 | Del Gludice |
| 3,049,374 A | 8/1962 | Nance |
| D198,498 S | 6/1964 | Malitte |
| D198,783 S | 8/1964 | Barecki |
| 3,333,890 A | 8/1967 | Whitwam |
| 3,615,118 A | 10/1971 | Buxton |
| 3,653,713 A | 4/1972 | Reason et al. |
| 3,795,422 A | 3/1974 | Robinson et al. |
| D239,148 S | 3/1976 | Smith et al. |
| 4,097,088 A | 6/1978 | Meiller |
| D250,071 S | 10/1978 | Dickerson |

(Continued)

FOREIGN PATENT DOCUMENTS

| | | |
|---|---|---|
| DE | 3 433 589 | 3/1986 |
| DE | 100 29 624 | 1/2002 |

(Continued)

OTHER PUBLICATIONS

U.S. Appl. No. 29/464,754, filed Aug. 20, 2013, Wilkens.

(Continued)

*Primary Examiner* — Milton Nelson, Jr.
(74) *Attorney, Agent, or Firm* — Knobbe Martens Olson & Bear, LLP

(57) ABSTRACT

An aircraft seating assembly having a back support, a seat bottom, a connection frame, and a convertible armrest. The width of the back support being such that, when two back supports are placed adjacent, the gap between adjacent sides is minor. The convertible armrest having a design which allows the armrest to pivot downward, from a first or deployed position, to a second or stowed position.

44 Claims, 16 Drawing Sheets

(56) References Cited

U.S. PATENT DOCUMENTS

| | | |
|---|---|---|
| D257,707 S | 12/1980 | Marrujo |
| 4,307,913 A | 12/1981 | Spiegelhoff |
| D267,372 S | 12/1982 | Long et al. |
| D268,972 S | 5/1983 | White |
| 4,489,978 A | 12/1984 | Brennan |
| 4,526,421 A | 7/1985 | Brennan et al. |
| 4,723,732 A | 2/1988 | Gorges |
| 4,726,621 A | 2/1988 | Muller |
| 4,836,602 A | 6/1989 | D'Almada Remedios et al. |
| 4,936,527 A | 6/1990 | Gorges |
| 5,118,163 A | 6/1992 | Brittian et al. |
| D336,379 S | 6/1993 | Veneruso |
| 5,375,907 A | 12/1994 | Rogers et al. |
| 5,507,556 A | 4/1996 | Dixon |
| 5,553,923 A | 9/1996 | Bilezikjian |
| 5,597,139 A | 1/1997 | Beroth |
| 5,611,503 A | 3/1997 | Brauer |
| 5,695,240 A | 12/1997 | Luria |
| 5,720,515 A | 2/1998 | Haffner |
| 5,730,458 A | 3/1998 | Byon |
| 5,800,013 A | 9/1998 | Branham et al. |
| 6,076,768 A | 6/2000 | Durand et al. |
| 6,092,705 A | 7/2000 | Meritt |
| D430,761 S | 9/2000 | Haney |
| 6,176,547 B1 | 1/2001 | Francois et al. |
| D441,210 S | 5/2001 | Mitjans |
| 6,450,571 B1 | 9/2002 | Canni et al. |
| 6,494,533 B1 | 12/2002 | Bohler |
| 6,588,848 B2 | 7/2003 | Cheng |
| 6,592,179 B1 | 7/2003 | Miyazaki |
| 6,644,738 B2 | 11/2003 | Williamson |
| 6,669,295 B2 | 12/2003 | Williamson |
| 6,672,661 B2 | 1/2004 | Williamson |
| D486,330 S | 2/2004 | Laming et al. |
| 6,739,552 B2 | 5/2004 | Sankrithi et al. |
| 6,739,671 B2 | 5/2004 | De Maina |
| 6,749,266 B2 | 6/2004 | Williamson |
| 6,761,398 B2 | 7/2004 | Bentley |
| 6,824,213 B2 * | 11/2004 | Skelly ............. B64D 11/0624 297/217.3 |
| 6,827,026 B2 | 12/2004 | Williamson et al. |
| D505,796 S | 6/2005 | Johnson |
| 6,960,110 B2 | 11/2005 | Hough |
| 6,994,401 B1 | 2/2006 | Fischer et al. |
| 7,066,551 B2 | 6/2006 | Johnson |
| 7,073,449 B2 | 7/2006 | Pipkin |
| 7,178,867 B2 | 2/2007 | Hough |
| 7,182,402 B1 | 2/2007 | Ahad |
| 7,252,569 B2 | 8/2007 | Everhart et al. |
| 7,261,369 B2 | 8/2007 | Ahad |
| 7,296,858 B2 | 11/2007 | Ruspa |
| 7,399,037 B2 | 7/2008 | Schumacher et al. |
| 7,500,716 B2 | 3/2009 | Guerin et al. |
| 7,611,198 B2 | 11/2009 | Schweizer |
| 7,621,593 B2 | 11/2009 | Dickinson |
| D605,863 S | 12/2009 | Aruga |
| D606,344 S | 12/2009 | Aruga et al. |
| 7,716,797 B2 | 5/2010 | Kismarton et al. |
| 7,871,039 B2 | 1/2011 | Fullerton et al. |
| D632,105 S | 2/2011 | Aruga et al. |
| 7,954,762 B2 | 6/2011 | Boren et al. |
| 7,971,929 B2 | 7/2011 | Kennard et al. |
| 8,016,361 B2 | 9/2011 | Kismarton et al. |
| 8,020,936 B2 | 9/2011 | Asami et al. |
| 8,028,958 B2 | 10/2011 | Kneller et al. |
| 8,047,613 B1 | 11/2011 | Ahad |
| 8,087,613 B2 | 1/2012 | Fullerton et al. |
| 8,141,948 B2 | 3/2012 | Cassellia et al. |
| 8,146,999 B2 | 4/2012 | Ferguson et al. |
| 8,186,760 B2 | 5/2012 | Kneller et al. |
| 8,205,833 B2 | 6/2012 | Kismarton et al. |
| D665,182 S | 8/2012 | Hilton et al. |
| 8,336,965 B2 | 12/2012 | Kismarton et al. |
| 8,393,680 B2 | 3/2013 | Zimmermann et al. |
| 8,444,226 B2 | 5/2013 | Driessen et al. |
| 8,464,982 B2 | 6/2013 | Raybell et al. |
| D686,422 S | 7/2013 | Robinson |
| 8,506,015 B2 | 8/2013 | Le et al. |
| 8,544,796 B2 | 10/2013 | Pozzi et al. |
| 8,550,564 B1 | 10/2013 | Kismarton et al. |
| 8,590,126 B2 | 11/2013 | Kismarton et al. |
| 8,596,723 B2 | 12/2013 | Ahad |
| 8,596,724 B1 | 12/2013 | Ahad |
| 8,602,499 B2 | 12/2013 | Driessen et al. |
| 8,613,479 B2 | 12/2013 | Schurg et al. |
| 8,636,003 B2 | 1/2014 | Deutscher et al. |
| D701,213 S | 3/2014 | Pajic |
| 8,667,904 B2 | 3/2014 | Pajic |
| 8,702,163 B2 | 4/2014 | Westerink |
| D707,999 S | 7/2014 | Takashi et al. |
| 8,763,976 B1 | 7/2014 | Jachim |
| 8,826,830 B2 | 9/2014 | Pajic |
| 8,851,565 B2 | 10/2014 | Hontz et al. |
| 8,905,470 B2 | 12/2014 | Shih et al. |
| 8,931,847 B2 | 1/2015 | Cailleteau et al. |
| 8,934,063 B2 | 1/2015 | Boyer, Jr. |
| 8,936,307 B2 | 1/2015 | Heredia |
| D723,819 S | 3/2015 | Takahashi et al. |
| D723,822 S | 3/2015 | Cai et al. |
| D724,338 S | 3/2015 | Nicholas |
| D724,339 S | 3/2015 | Cai et al. |
| 8,974,002 B2 | 3/2015 | Le et al. |
| D725,927 S | 4/2015 | Carter |
| 9,016,627 B2 | 4/2015 | Margis et al. |
| 9,045,096 B2 | 6/2015 | Procter et al. |
| 9,067,682 B2 | 6/2015 | Pajic |
| 9,090,352 B2 | 7/2015 | Saada et al. |
| 9,138,055 B2 | 9/2015 | Curtis et al. |
| 9,167,905 B2 | 10/2015 | Pajic |
| 9,168,876 B2 | 10/2015 | Pajic |
| 9,242,733 B2 | 1/2016 | Pajic |
| D750,392 S | 3/2016 | Wilkens |
| 9,327,836 B2 | 5/2016 | Weitzel et al. |
| 9,352,840 B2 | 5/2016 | Schultheis |
| 9,376,047 B2 | 6/2016 | Ulbrich-Gasparevic et al. |
| 9,403,596 B2 | 8/2016 | Pajic |
| 9,409,647 B2 | 8/2016 | Pajic |
| 9,415,874 B2 | 8/2016 | Curtis et al. |
| 2003/0094542 A1 | 5/2003 | Williamson |
| 2003/0094837 A1 | 5/2003 | Williamson |
| 2003/0094842 A1 | 5/2003 | Williamson |
| 2004/0021349 A1 | 2/2004 | Longtin et al. |
| 2004/0046430 A1 | 3/2004 | Plant et al. |
| 2004/0099766 A1 | 5/2004 | Pratt |
| 2004/0212228 A1 | 10/2004 | Skelly et al. |
| 2005/0184566 A1 | 8/2005 | Baumann et al. |
| 2005/0194828 A1 | 9/2005 | Johnson et al. |
| 2007/0018494 A1 | 1/2007 | Gutosky, Jr. |
| 2007/0200414 A1 | 8/2007 | Pozzi |
| 2007/0283855 A1 | 12/2007 | Pozzi |
| 2008/0116731 A1 | 5/2008 | Schurg et al. |
| 2009/0217846 A1 | 9/2009 | Harris |
| 2011/0174926 A1 | 7/2011 | Margis et al. |
| 2011/0233339 A1 | 9/2011 | Plant et al. |
| 2012/0138744 A1 | 6/2012 | Fullerton et al. |
| 2012/0205329 A1 | 8/2012 | Fujita et al. |
| 2012/0298798 A1 | 11/2012 | Henshaw |
| 2013/0002001 A1 | 1/2013 | Allen et al. |
| 2013/0038103 A1 | 2/2013 | Scott |
| 2013/0080357 A1 | 3/2013 | Boren et al. |
| 2013/0093220 A1 | 4/2013 | Pajic |
| 2013/0147240 A1 | 6/2013 | Lee |
| 2013/0314861 A1 | 11/2013 | Burford |
| 2013/0327255 A1 | 12/2013 | Pajic |
| 2014/0159441 A1 | 6/2014 | Philipzik et al. |
| 2014/0175843 A1 | 6/2014 | Westerink et al. |
| 2014/0284972 A1 | 9/2014 | Riedel et al. |
| 2014/0284973 A1 | 9/2014 | Wolgast et al. |
| 2014/0375090 A1 | 12/2014 | Wegenka et al. |
| 2015/0091337 A1 | 4/2015 | Cailleteau et al. |
| 2015/0091342 A1 | 4/2015 | Cailleteau et al. |
| 2015/0227277 A1 | 8/2015 | Margis et al. |
| 2015/0246645 A1 | 9/2015 | Procter et al. |
| 2015/0284095 A1 | 10/2015 | Pozzi et al. |

(56) References Cited

U.S. PATENT DOCUMENTS

| | | |
|---|---|---|
| 2015/0291073 A1 | 10/2015 | Pajic |
| 2016/0009398 A1 | 1/2016 | Klettke |
| 2016/0023618 A1 | 1/2016 | Pajic |
| 2016/0039523 A1 | 2/2016 | Guttropf et al. |
| 2016/0039524 A1 | 2/2016 | Zheng et al. |
| 2016/0114891 A1 | 4/2016 | Pajic |
| 2016/0152169 A1 | 6/2016 | Zheng et al. |
| 2016/0272125 A1 | 9/2016 | Barnes |
| 2016/0274674 A1 | 9/2016 | Valdes et al. |

FOREIGN PATENT DOCUMENTS

| | | |
|---|---|---|
| DE | 100 42 495 | 3/2002 |
| DE | 101 18 496 | 10/2002 |
| DE | 203 15 554 | 12/2003 |
| DE | 10 2004 047 609 | 5/2005 |
| DE | 10 2005 051 138 | 5/2007 |
| DE | 10 2007 046 130 | 4/2009 |
| DE | 20 2012 100 251 | 2/2012 |
| DE | 20 2012 105 089 | 1/2013 |
| DE | 20 2013 102 887 | 7/2013 |
| DE | 10 2013 017 696 | 7/2014 |
| DE | 10 2013 020 439 | 6/2015 |
| DE | 10 2014 220 549 | 4/2016 |
| DE | 10 2014 222 672 | 5/2016 |
| DE | 10 2016 000 818 | 7/2016 |
| EP | 0 018 662 | 11/1980 |
| EP | 1 712 421 | 10/2006 |
| EP | 2 110 313 | 10/2009 |
| EP | 1 789 317 B1 | 4/2010 |
| EP | 2 569 187 | 3/2013 |
| EP | 2 602 149 | 6/2013 |
| EP | 2 620 321 | 7/2013 |
| EP | 2 639 103 | 9/2013 |
| EP | 2 483 150 | 1/2014 |
| EP | 2 726 373 | 5/2014 |
| EP | 2 746 158 | 6/2014 |
| EP | 2 759 447 | 7/2014 |
| EP | 2 799 338 | 11/2014 |
| EP | 2 877 398 | 6/2015 |
| EP | 2 917 105 | 9/2015 |
| EP | 2 981 464 | 2/2016 |
| EP | 3 063 036 | 9/2016 |
| FR | 2 577 776 | 8/1986 |
| FR | 2 923 780 | 5/2009 |
| FR | 2 982 218 | 5/2013 |
| FR | 3 024 090 | 1/2016 |
| GB | 2 438 090 | 11/2007 |
| JP | 5 702 190 | 4/2015 |
| WO | WO 00/02745 | 1/2000 |
| WO | WO 02/32268 | 4/2002 |
| WO | WO 03/106261 | 12/2003 |
| WO | WO 2006/029659 | 3/2006 |
| WO | WO 2007/015832 | 5/2007 |
| WO | WO 2007/123615 | 11/2007 |
| WO | WO 2009/098381 | 8/2009 |
| WO | WO 2011/018930 | 2/2011 |
| WO | WO 2011/143648 | 11/2011 |
| WO | WO 2012/064922 | 5/2012 |
| WO | WO 2012/118096 | 9/2012 |
| WO | WO 2013/003537 | 1/2013 |
| WO | WO 2013/055671 | 4/2013 |
| WO | WO 2013/068316 | 5/2013 |
| WO | WO 2013/109751 | 7/2013 |
| WO | WO 2013/166067 | 11/2013 |
| WO | WO 2014/075040 | 5/2014 |
| WO | WO 2014/161583 | 10/2014 |
| WO | WO 2014/163579 | 10/2014 |
| WO | WO 2014/176017 | 10/2014 |
| WO | WO 2015/063082 | 5/2015 |
| WO | WO 2015/157309 | 10/2015 |
| WO | WO 2016/012693 | 1/2016 |
| WO | WO 2016/076921 | 5/2016 |
| WO | WO 2016/140631 | 9/2016 |

OTHER PUBLICATIONS

International Search Report and Written Opinion in co-pending Patent Application No. PCT/US2014/033071, mailed Jul. 28, 2014, in 11 pages.

International Search Report and Written Opinion in co-pending Patent Application No. PCT/US2016/027145, mailed Sep. 12, 2016, in 21 pages.

Invitation to Pay Additional Fees in co-pending International Patent Application No. PCT/US2016/027145, mailed Jul. 22, 2016 in 10 pages.

* cited by examiner

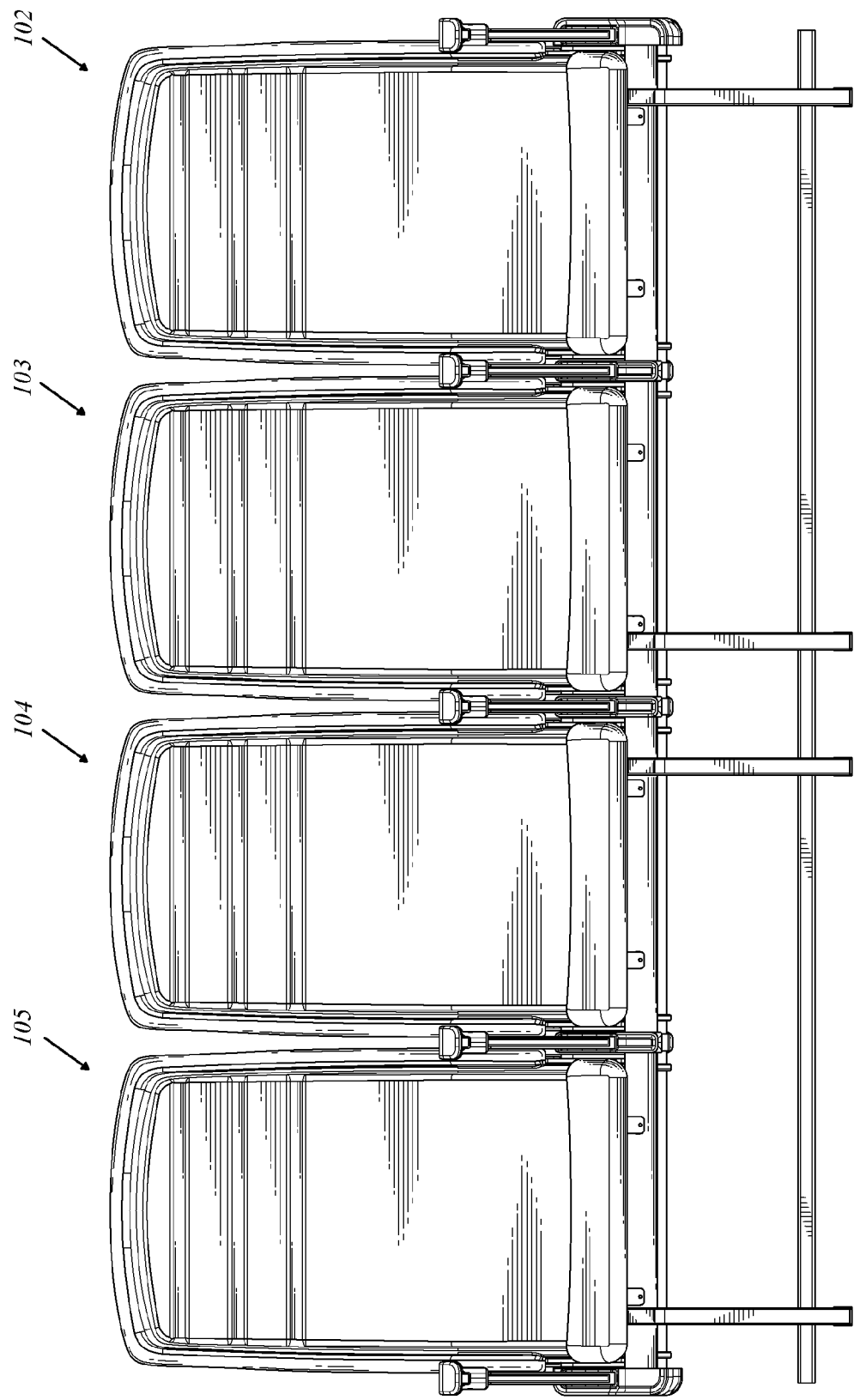

AIRCRAFT SEATING ASSEMBLY WITH REDUCED SPACING

RELATED APPLICATIONS

The present application is a continuation-in-part of U.S. application Ser. No. 29/464,754 filed Aug. 20, 2013, titled AIRCRAFT SEATING ASSEMBLY, and claims priority to U.S. Provisional Application No. 61/816,652 filed Apr. 26, 2013, titled AIRCRAFT SEATING ASSEMBLY WITH REDUCED SPACING, the entire contents of both of which are hereby expressly incorporated by reference.

DESCRIPTION OF THE RELATED ART

The structure of aircraft seats plays a significant role in the airline industry. As passenger seating is typically arranged in rows with one or more aisles separating parts of each row, aircraft seating assemblies typically are configured as 2, 3 or 4 seat units. These aircraft seating assemblies have a structure for withstanding forces caused not only due to acceleration and deceleration of the aircraft during normal operation, but also substantial forces caused during emergencies. Significantly, the aircraft seats desirably achieve this performance while being relatively lightweight. Further, while the structural integrity and weight of the seating assemblies is important, the cost of the assemblies is also an important consideration.

While there are many existing aircraft seat assemblies, such seating assemblies and certain components thereof have various limitations and disadvantages.

SUMMARY OF THE INVENTION

Embodiments of an aircraft seating assembly are disclosed which are both compliant with industry regulations and lightweight yet capable of withstanding significant forces. Industry regulations require that at least a certain percentage of aircraft seats must have armrests which can be moved to provide unimpeded side-to-side access into the row of seats. Additionally, regulations also place significant regulations on the structural integrity of these armrests. For example, regulations may require that the armrest be capable of supporting a three-hundred pound weight. In order to comply with these regulations, current aircraft seats have armrests which pivot upwards into the back of the seat to provide the unobstructed access as required by these regulations. One aspect of one aspect of the invention is the realization that this gap is often undesirable as it reduces the potential width for an aircraft seat.

In some embodiments, the aircraft seating assembly has a back support with a back support frame and back support cushion. In addition, the assembly may also have a seat bottom which includes a seat frame and a seat cushion attached to the seat frame. The assembly may additionally include one or a plurality of armrests having a platform portion and a mount portion, the mount portion being supported by at least one of the back support frame, the seat frame, or a connection frame, the armrest being capable of pivoting from a first position to support an arm of a seated passenger to a second position configured to allow unhindered entry laterally across the seat. In some embodiments, the armrest pivots downward from the first position to the second position. The armrest may be positioned, in the second position, such that the upper surface of the platform portion is generally flush with the top surface of the seat. In other embodiments, the armrest pivots upward from the first position to the second position. The armrest may be positioned such that, in the second position, the bottom-most surface of the armrest is generally flush with, or below, the front side of the back support. In some embodiments, the armrest does not extend below the bottom of the seat. The armrest may operate as a four-bar linkage system and have a detent and retention mechanism to lock the base in a first position.

In some embodiments, the width of the back support above and adjacent to a plane defined by the deployed position is greater than the seat width. In some embodiments, the width of the back support is greater than the seat width plus at least one-half of a platform width. In some embodiments, the aircraft seating assembly may include a recess for a display monitor and may also include a tray.

BRIEF DESCRIPTION OF THE DRAWINGS

FIG. 8 is a schematic view of an aircraft seating assembly with four adjacent seats.

DETAILED DESCRIPTION OF THE PREFERRED EMBODIMENT

Embodiments of an aircraft seating assembly are disclosed herein. In certain embodiments, there is disclosed an aircraft seating assembly including an improved structure which provides for a decrease in the gap between adjacent seats.

In the following detailed description, terms of orientation such as "top", "bottom", "left", "right", "front", "rear", "horizontal", "vertical", "midpoint" and "end" are used here to simplify the description in the context of the illustrated embodiment. Because other orientations are possible, however, the disclosure should not be limited to the illustrated orientation. Those skilled in the art will appreciate that other orientations of the various components described above are possible.

Figure 7:
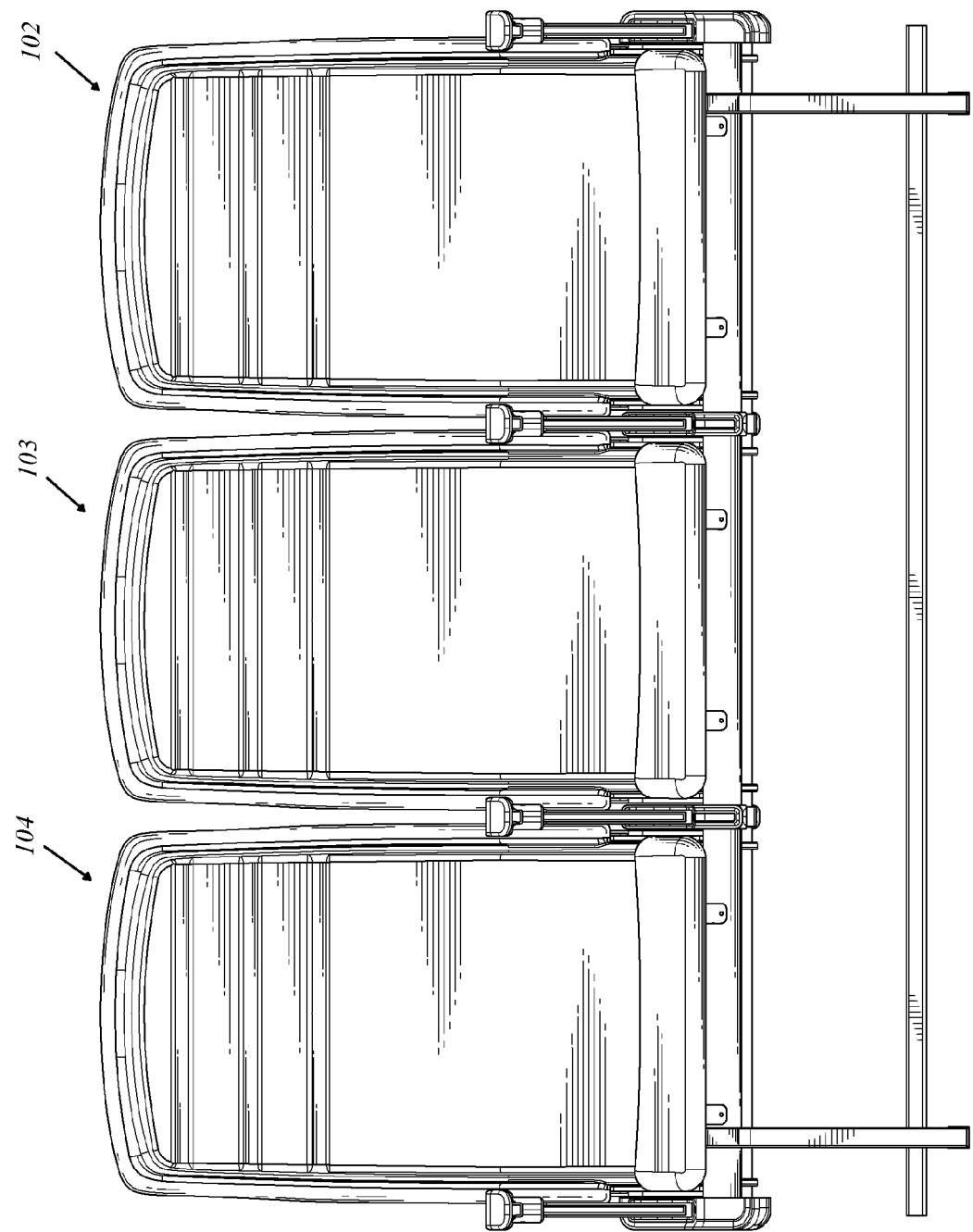
FIG. 7 is a schematic view of an aircraft seating assembly with three adjacent seats.

FIGS. 1-4 are illustrations of an embodiment of an aircraft seating assembly 100 having two seats 102, 104 each of which defines a seating position for one passenger and, typically, for an adult passenger. However, it should be understood that the aircraft seating assembly 100 may be expanded to include additional seats or reduced to include fewer seats. For example, the aircraft seating assembly 100 may include three seats 102, 103, 104 (see FIG. 7), four seats 102, 103, 104, 105 (see FIG. 8) or more seats in a single aircraft seating assembly. In some embodiments, the aircraft seating assembly 100 can include only a single seat. Since both seats 102, 104 are similar in design and construction, only the first seat 102 will be described in detail. The first seat 102 includes a back support or back support member 106, a seat bottom 108, a connection frame 110, and a convertible armrest 112. The aircraft seating assembly 100 is designed to be placed within the cabin of an aircraft and attached to the cabin utilizing conventional connection mechanisms, secured to the connection frame 110, known in the aircraft design art.

Figure 1A:
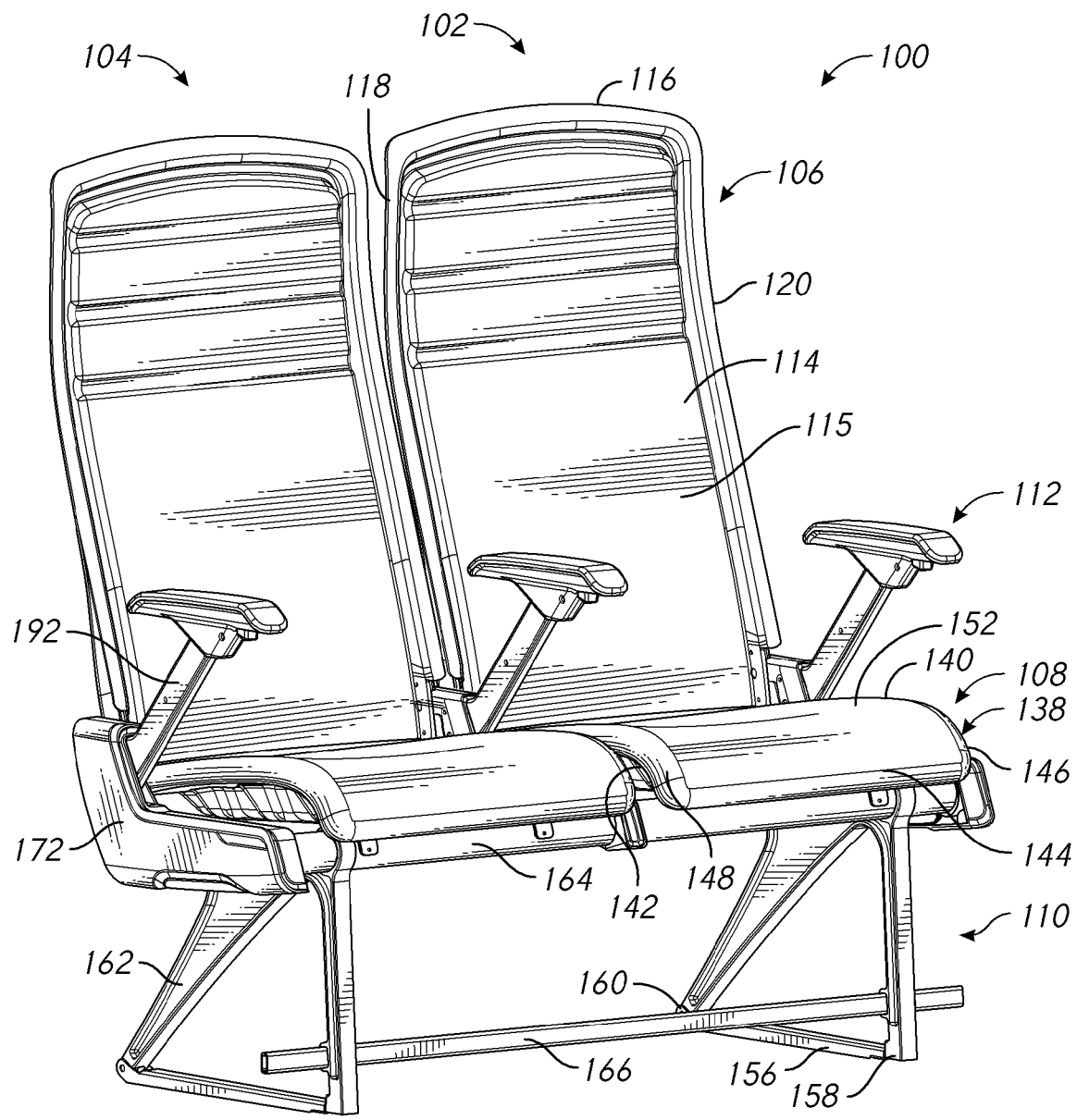
FIG. 1A is a perspective view of an aircraft seating assembly showing an upright support, a horizontal support, a convertible support, and a connection frame.
Figure 1B:
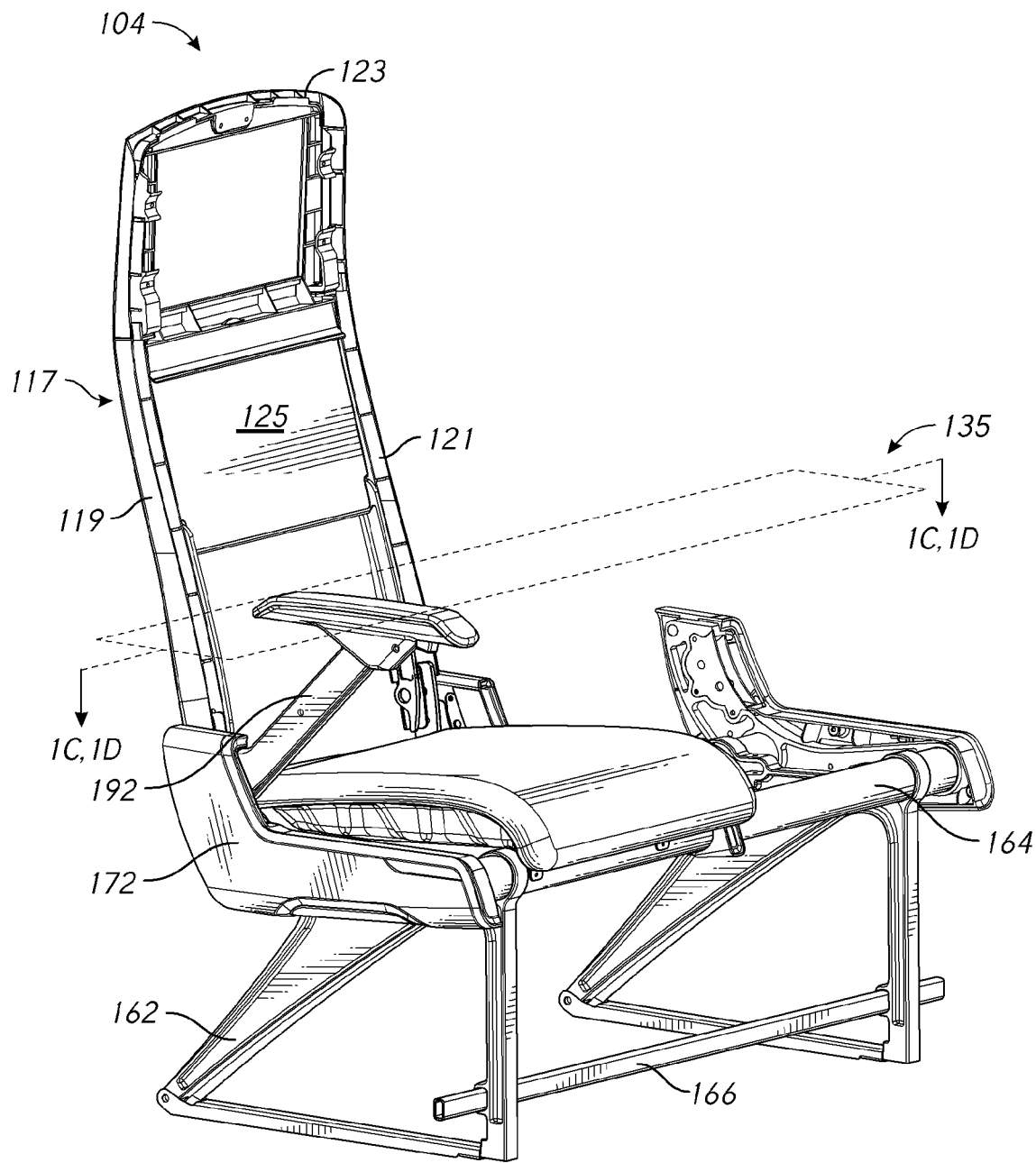
FIG. 1B is a perspective view of an aircraft seating assembly with the panel removed.
Figure 1C:
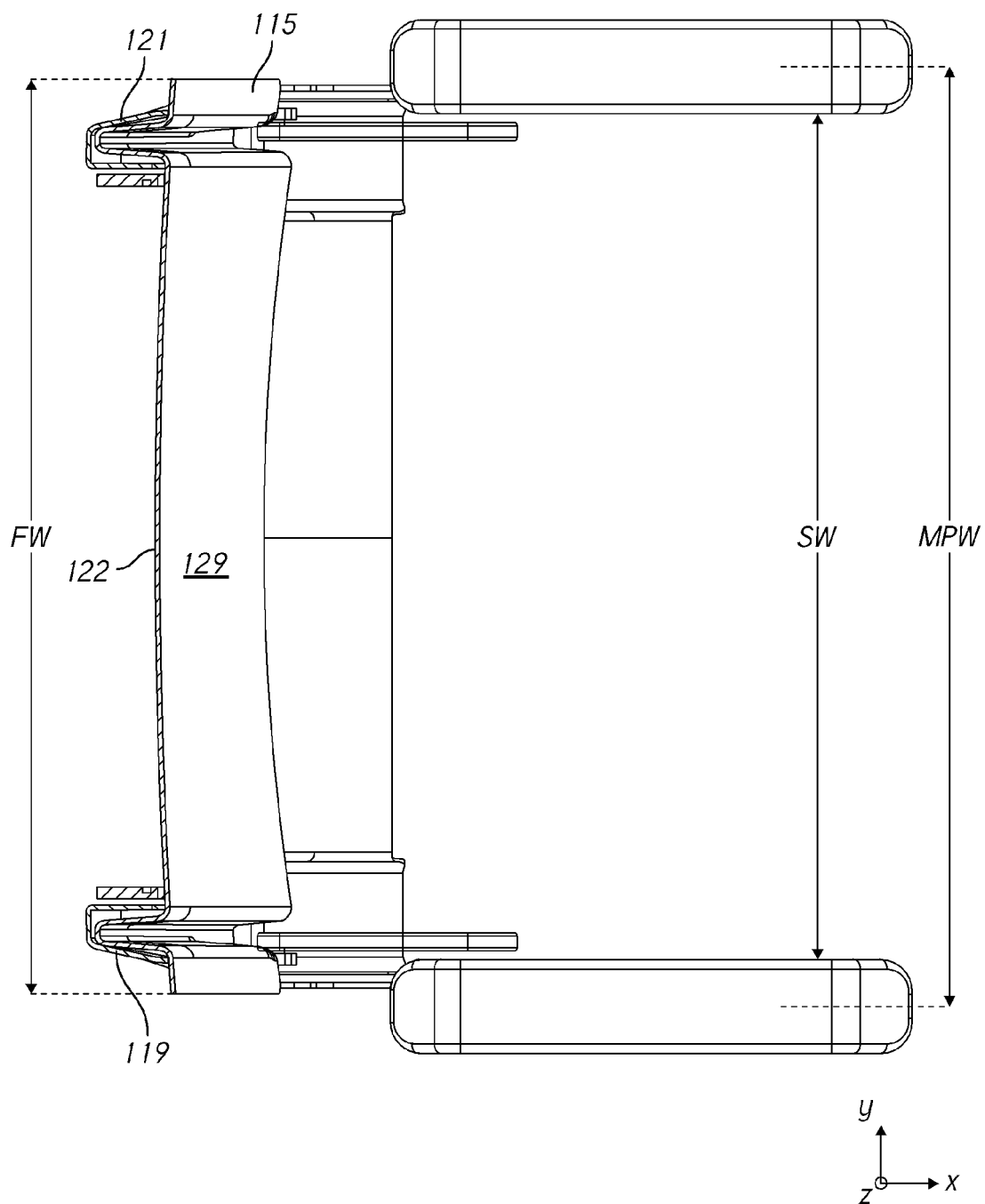
FIG. 1C is a sectional view along line 1C, 1D with the contoured panel attached and other components of the aircraft seating assembly removed for clarity.
Figure 1D:
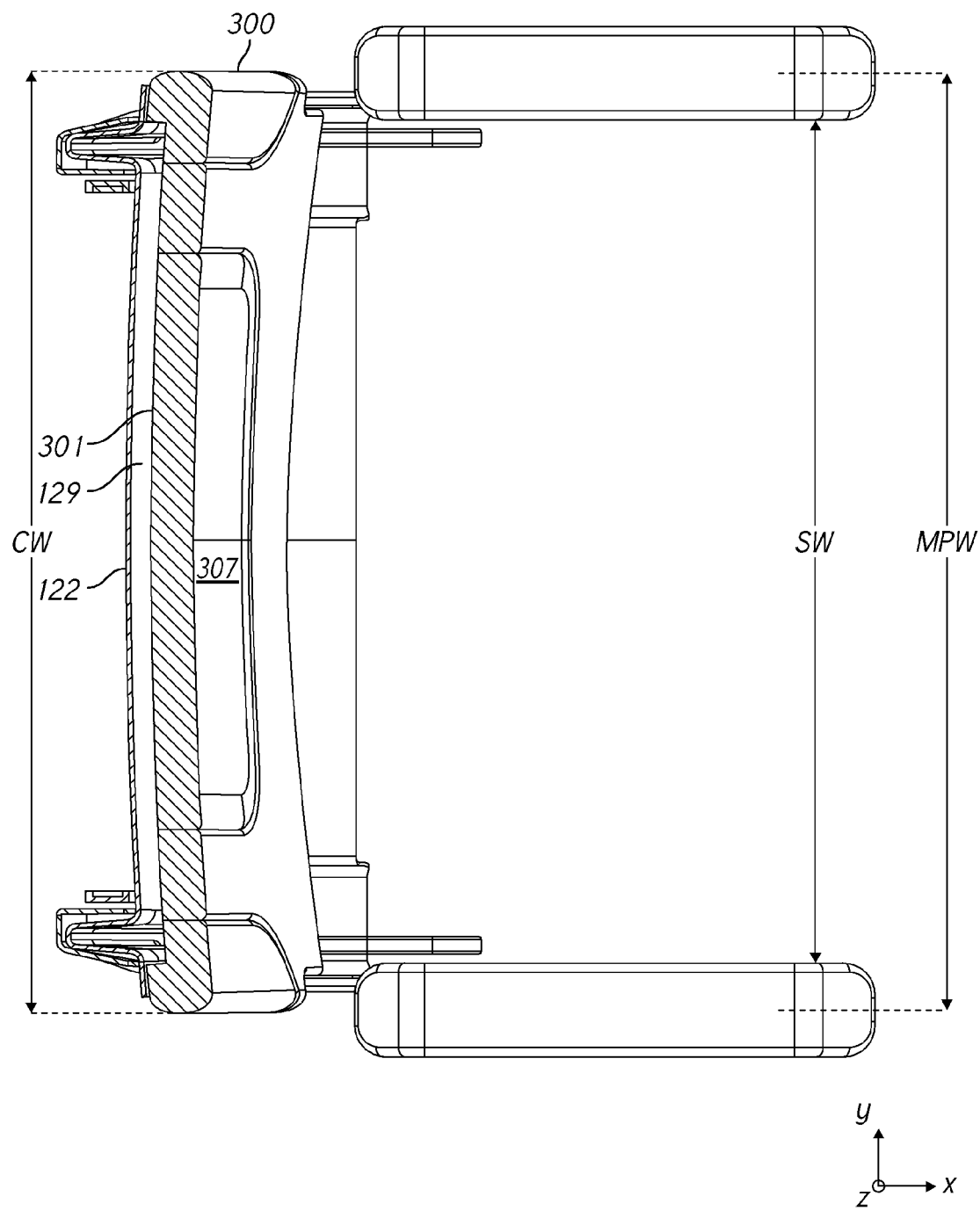
FIG. 1D is a sectional view similar to that of FIG. 1C with a cushion attached to the countered panel.

With reference to FIGS. 1A and 1B, which is a perspective view of the aircraft seating assembly 100, the back support member 106 has a frame 114 which may include a contoured panel 115 and a peripheral strut assembly 117. The peripheral strut assembly 117 may include first and second vertical struts 119, 121 as well as a connecting member 123. The frame 114 may additionally include additional plate connecting elements 125. Since the back support member 106 is, under normal use, designed to support the back of a seated passenger, the frame 114 may be shaped to follow the natural contours of an average passenger's back while seated. This shape may help to ensure that the passenger can be comfortably seated in an ergonomic position during the flight. Furthermore, in some embodiments, the back support member 106 is designed to withstand not only the forces generated on a passenger's body during the normal course of operation of a typical flight, but also the substantial forces that may occur as a result of emergency situations. As such, the frame 114 can be constructed using lightweight but high-strength materials, such as composites including fiberglass and carbon fiber, polymers, and any other materials known in the art. Additionally, different parts of the frame 114 may be constructed from different materials. It should be appreciated that, in other embodiments, the frame 114 may include a panel with a different shape.

Figure 2A:
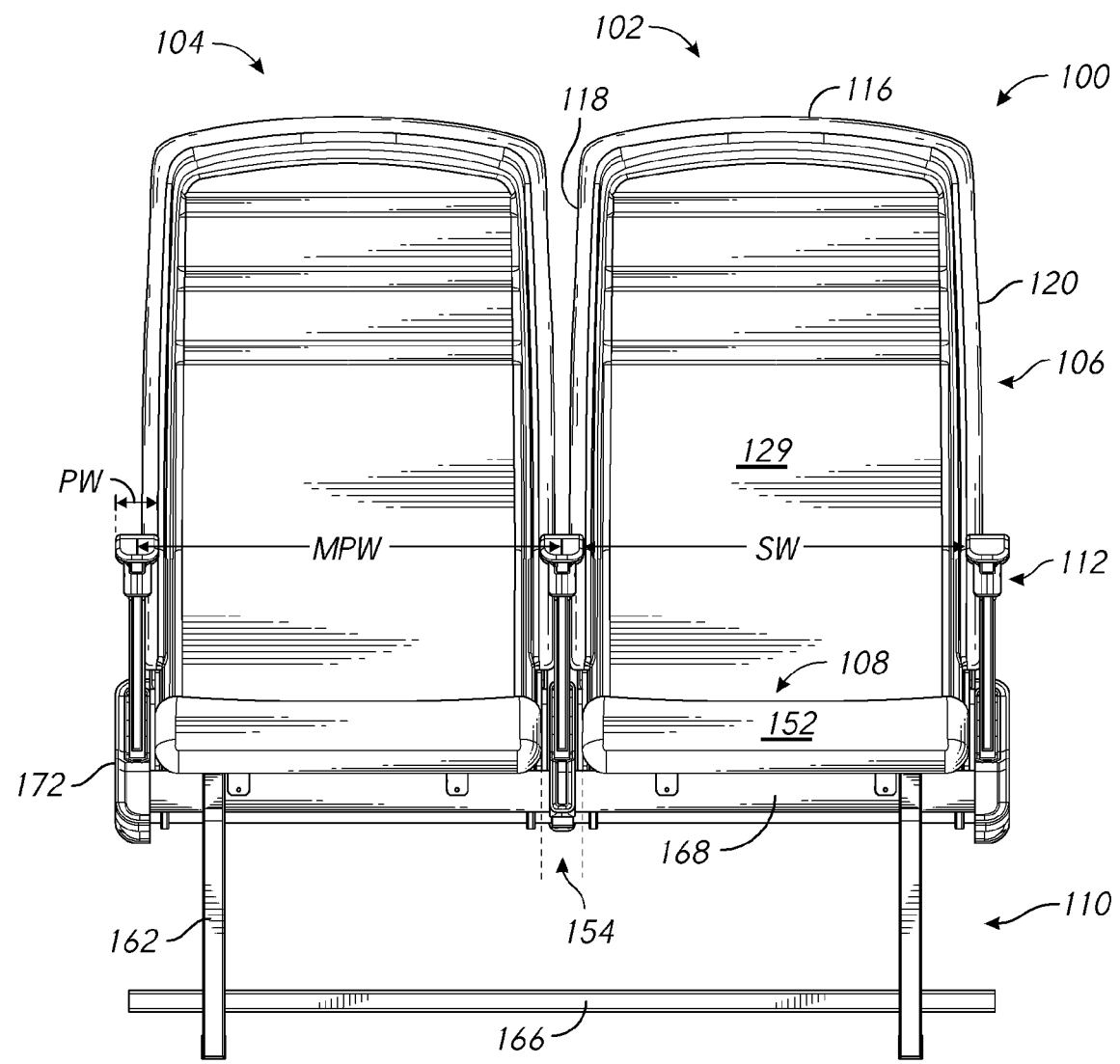
FIG. 2A is a front view of the aircraft seating assembly of FIG. 1A.
Figure 2B:
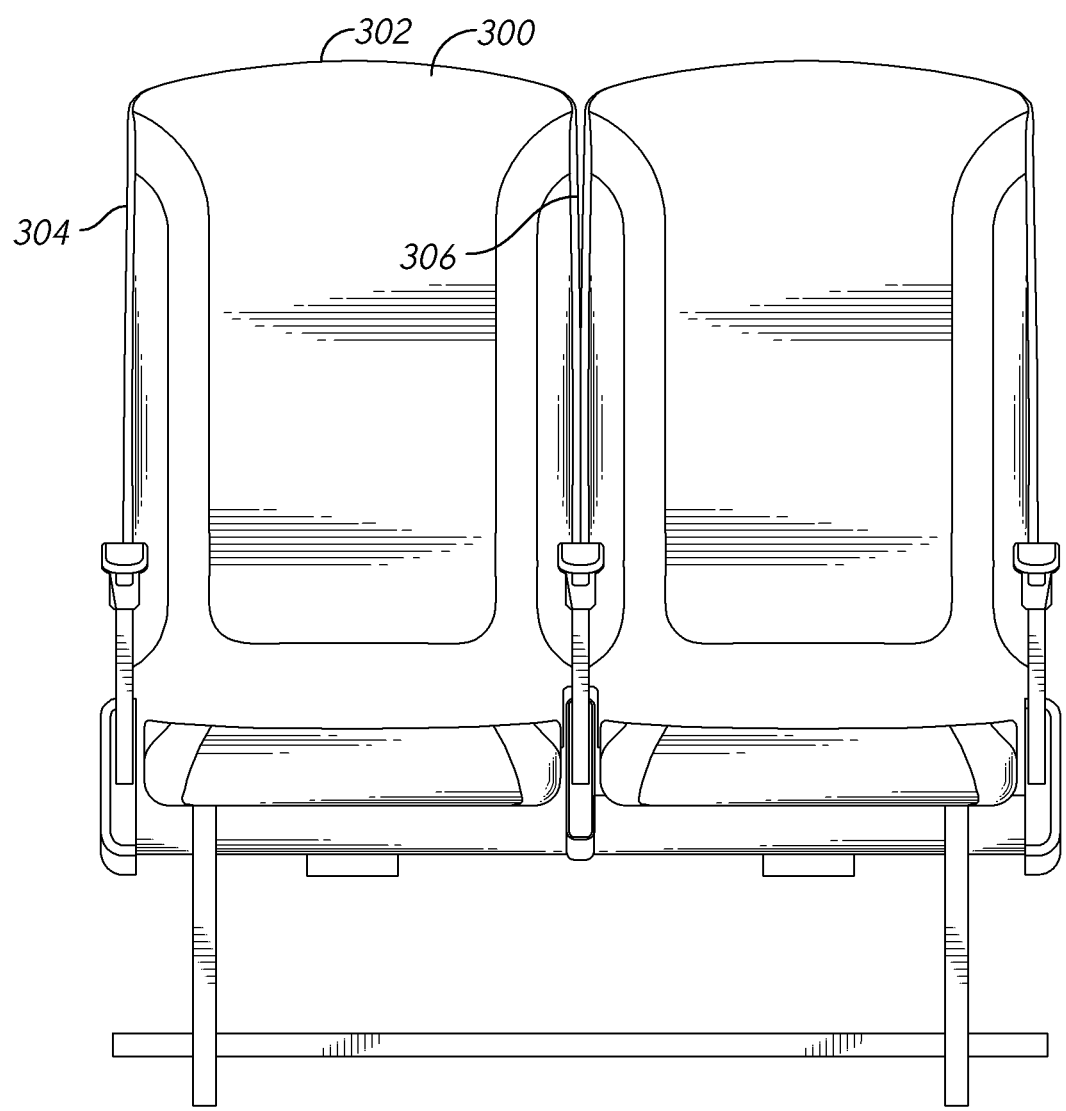
FIG. 2B is a front view of the aircraft seating assembly of FIG. 1A with cushioning.

With reference to FIGS. 2A and 2B, which is a front view of the aircraft seating assembly 100, the frame 114 may have a top side 116, a first or left side 118, and first or right side 120, and a bottom side 122 (shown in FIG. 3) extending around the periphery of the frame 114. In other embodiments, there may exist a greater number or fewer number of sides depending on the shape of the frame 114. The frame 114 may include a front surface or front side 129 directed towards the back of a seated passenger. In some embodiments, the front surface 129 may have a cushion 300 attached on its face such that a passenger need not directly contact the front surface 129 which may be made of an inflexible material. In some embodiments, the cushion 300 is attached to a portion of the front surface 129 with the remainder of the cushion 300 being spaced apart from the front surface 129 such that a gap is formed between the front surface 129 of the frame 114 and the rear surface 301 of the cushion 300 (see FIG. 1D). As shown in the illustrated embodiment, as well as on FIG. 1D, the cushion 300 can at least partially extend beyond the sides of the frame 114. In some embodiments, the top side 302 of the cushion 300 extends above the top side 116 of the frame 114, the left side 304 of the cushion 300 extends beyond the left side 118 of the frame 114, and the right side 306 of the cushion 300 extends beyond the right side 120 of the frame 114. Moreover, the front surface or front side 307 of the cushion 300 is forward of the front surface 129 of the frame 114. The cushion 300 can have different designs and can be of different construction. For example, the type of materials used for certain regions of the cushion can be chosen to provide different levels of cushioning on different parts of a passengers body. The cushion 300 could be made of a more flexible material such as foam or rubber. This cushion 300 could therefore reduce shocks transmitted to the passenger's body. In other embodiments, the cushion 300 may additionally cover other parts of the back support member 106. It should be appreciated that, in some embodiments, the frame 114 may be made of a sufficiently soft material that no cushion is used.

Figure 3A:
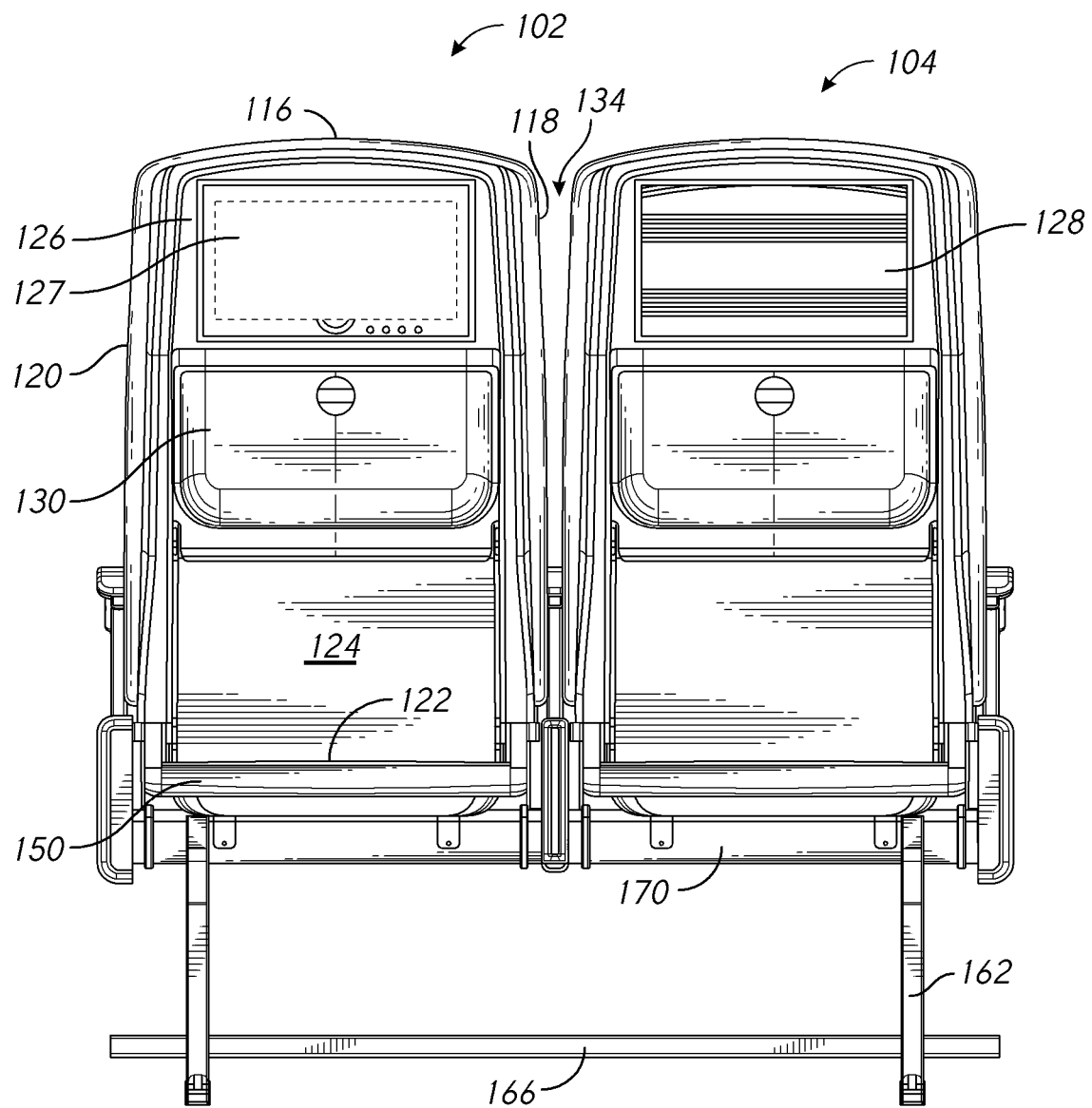
FIG. 3A is a rear view of the aircraft seating assembly of FIG. 1A.
Figure 3B:
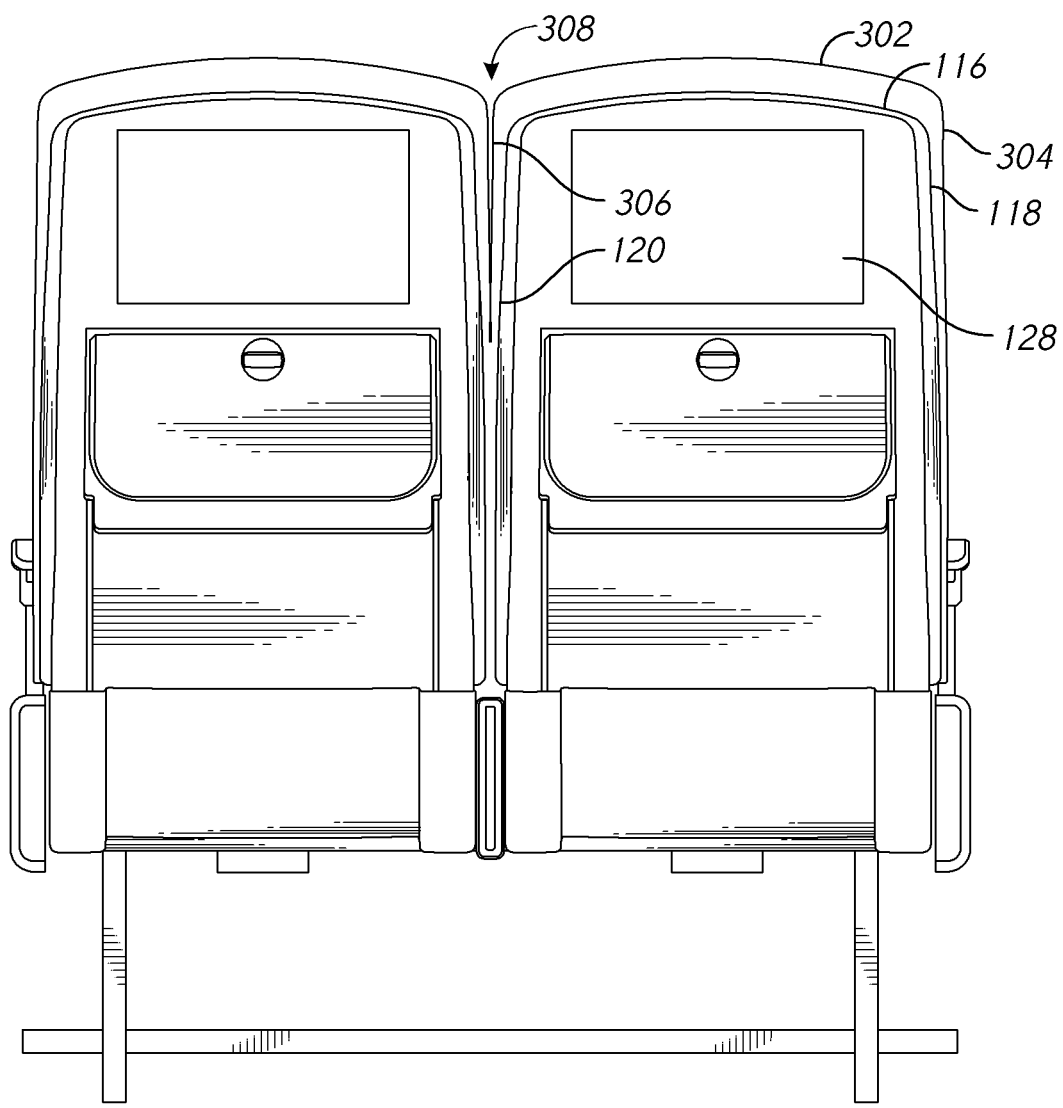
FIG. 3B is a rear view of the aircraft seating assembly of FIG. 1A with cushioning.

With reference to FIGS. 3A and 3B, which is a rear view of the aircraft seating assembly 100, the back support member 106 may include additional features along its rear surface or rear side 124. These features may be used by a passenger seated behind the seat 102. For example, in the illustrated embodiment, the rear surface 124 may include a shroud 126 attached to the frame 114 for holding a display monitor 127 having a display screen 131. An aperture 128 may be included in the shroud 126 to allow viewing of the display monitor 127. In other embodiments, a display monitor 127 may be directly attached to the frame 114.

In some embodiments, the display monitor 127 and/or display screen 131 may have a diagonal dimension of approximately 12 to 16 inches. For example, in some embodiments, the display monitor 127 and/or display screen 131 has a diagonal dimension of at least 12, 13, 14, 14.5, 15, 15.5, 16, 17, or 18 inches.

Additionally, in some embodiments, the display monitor 127 and/or display screen 131 may have a width defined as the distance between the left and right sides of the display monitor 127. In some embodiments, the width of the display monitor is within 0.7 to 1.2, 0.8 to 1.1, or 0.9 to 1.0 of the width of the seat bottom 108 (i.e., between 70% to 120%, between 80% to 110%, or between 90% to 100% of the width of the seat bottom 108).

Additionally, in some embodiments, the width of the display monitor 127 and/or display screen 131 is between 70% to 120%, between 80% to 110%, or between 90% to 100% the minimum, maximum, and/or average width of the seat bottom 108. In some embodiments, the maximum width of the display monitor 127 and/or display screen 131 is between 70% to 120%, between 80% to 110%, or between 90% to 100% the minimum, maximum, and/or average width of the seat bottom 108. In some embodiments, the minimum width of the display monitor 127 and/or display screen 131 is between 70% to 120%, between 80% to 110%, or between 90% to 100% the minimum, maximum, and/or average width of the seat bottom 108. In some embodiments, the average width of the display monitor 127 and/or display screen 131 is between 70% to 120%, between 80% to 110%, or between 90% to 100% the minimum, maximum, and/or average width of the seat bottom 108.

In some embodiments, the width of the display monitor 127 and/or the display screen 131 is between 50% to 150%, between 75% to 125%, or between 90% to 110% of the seat width SW defined below or the width of the seat bottom. In some embodiments, the minimum width of the display monitor 127 and/or the display screen 131 is between 50% to 150%, between 75% to 125%, or between 90% to 110% of the seat width SW or the width of the seat bottom. In some embodiments, the maximum width of the display monitor 127 and/or the display screen 131 is between 50% to 150%, between 75% to 125%, or between 90% to 110% of the seat width SW or the width of the seat bottom. In some embodiments, the average width of the display monitor 127 and/or the display screen 131 is between 50% to 150%, between 75% to 125%, or between 90% to 110% of the seat width SW or the width of the seat bottom.

In some embodiments, the ratio of the seat width SW to the width of the display monitor 127 and/or the display screen 131 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios. In some embodiments, the ratio of the seat width SW to the minimum width of the display monitor 127 and/or the display screen 131 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios. In some embodiments, the ratio of the seat width SW to the maximum width of the display monitor 127 and/or the display screen 131 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios. In some embodiments, the ratio of the seat width SW to the average width of the display monitor 127 and/or the display screen 131 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios.

In some embodiments, the ratio of the width of the seat bottom to the width of the display monitor 127 and/or the display screen 131 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios. In some embodiments, the ratio of the width of the seat bottom to the minimum width of the display monitor 127 and/or the display screen 131 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios. In some embodiments, the ratio of the width of the seat bottom to the maximum width of the display monitor 127 and/or the display screen 131 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios. In some embodiments, the ratio of the width of the seat bottom to the average width of the display monitor 127 and/or the display screen 131 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios.

In other embodiments, the display screen 131 of the display monitor 127 may have a diagonal dimension of approximately 14 to 15.5 inches. In yet other embodiments, the display screen 131 of the display monitor 127 may have a diagonal dimension of approximately 14.6 inches. It should be appreciated by one of skill in the art that the size of the display monitor 127 and display screen 131 is limited by the width of the rear surface 124 of the back support member 106. Increasing the width of the rear surface 124 would allow for the use of a larger display monitor 127 and/or display screen 131 thereby enhancing the entertainment experience of passengers on board the aircraft.

Figure 3C:
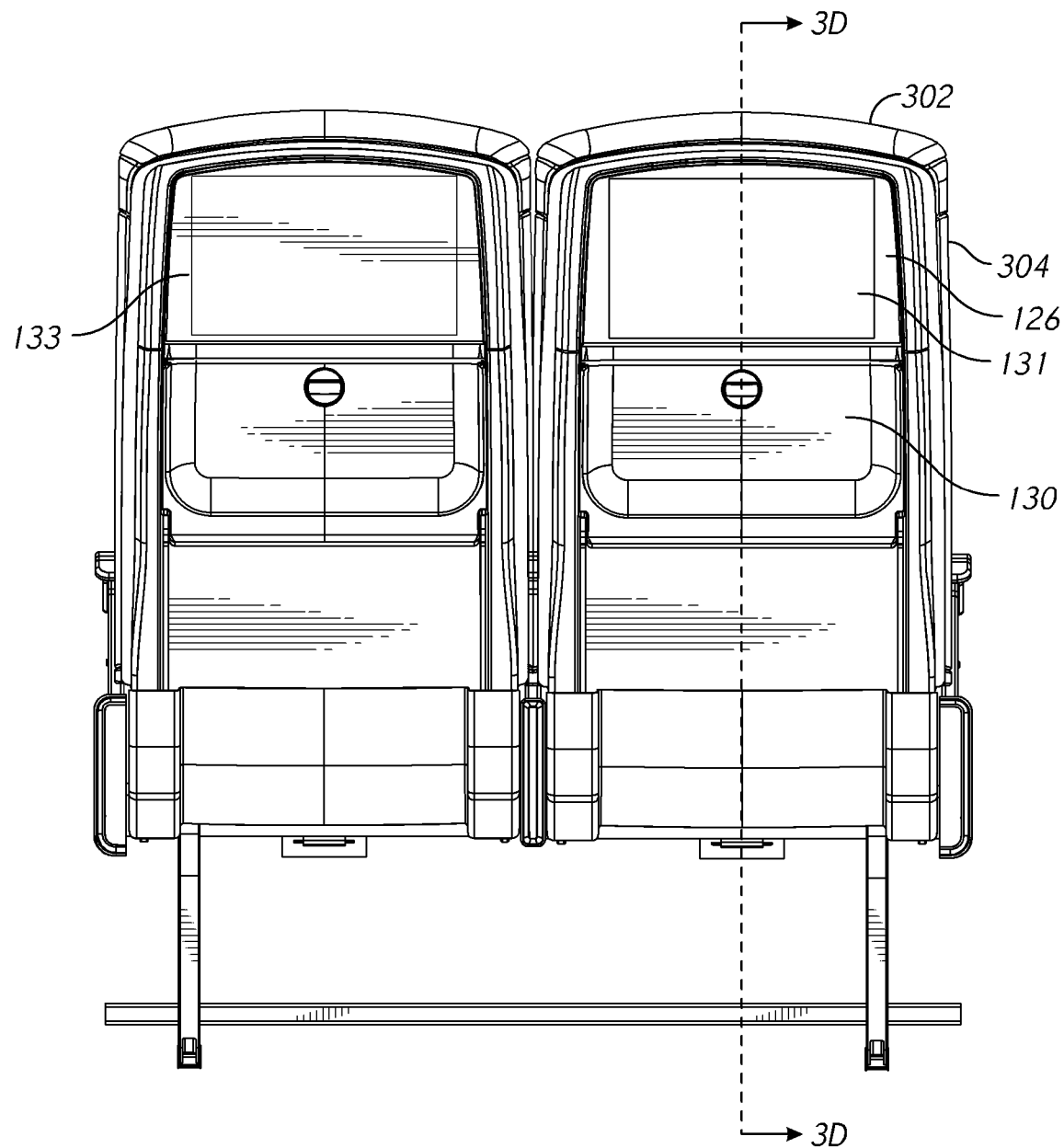
FIG. 3C is a rear view of another embodiment of an aircraft seating assembly.
Figure 3D:
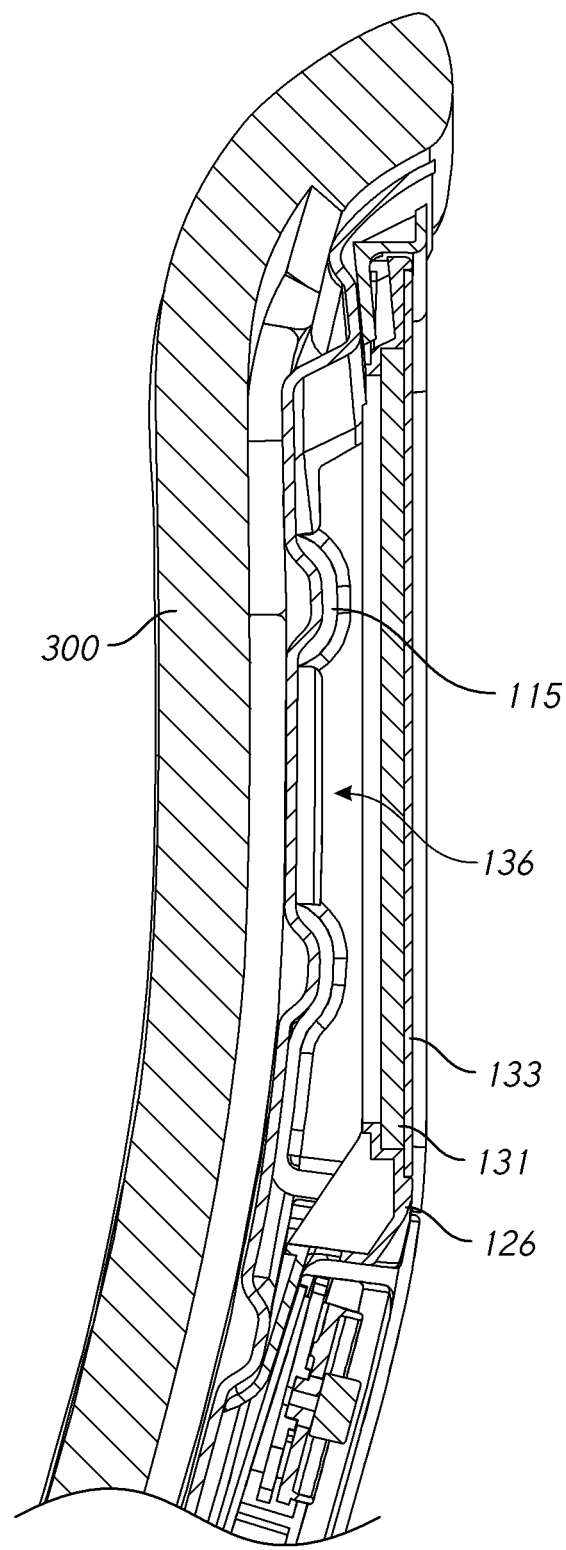
FIG. 3D is a sectional view along line 3D of FIG. 3.
Figure 4A:
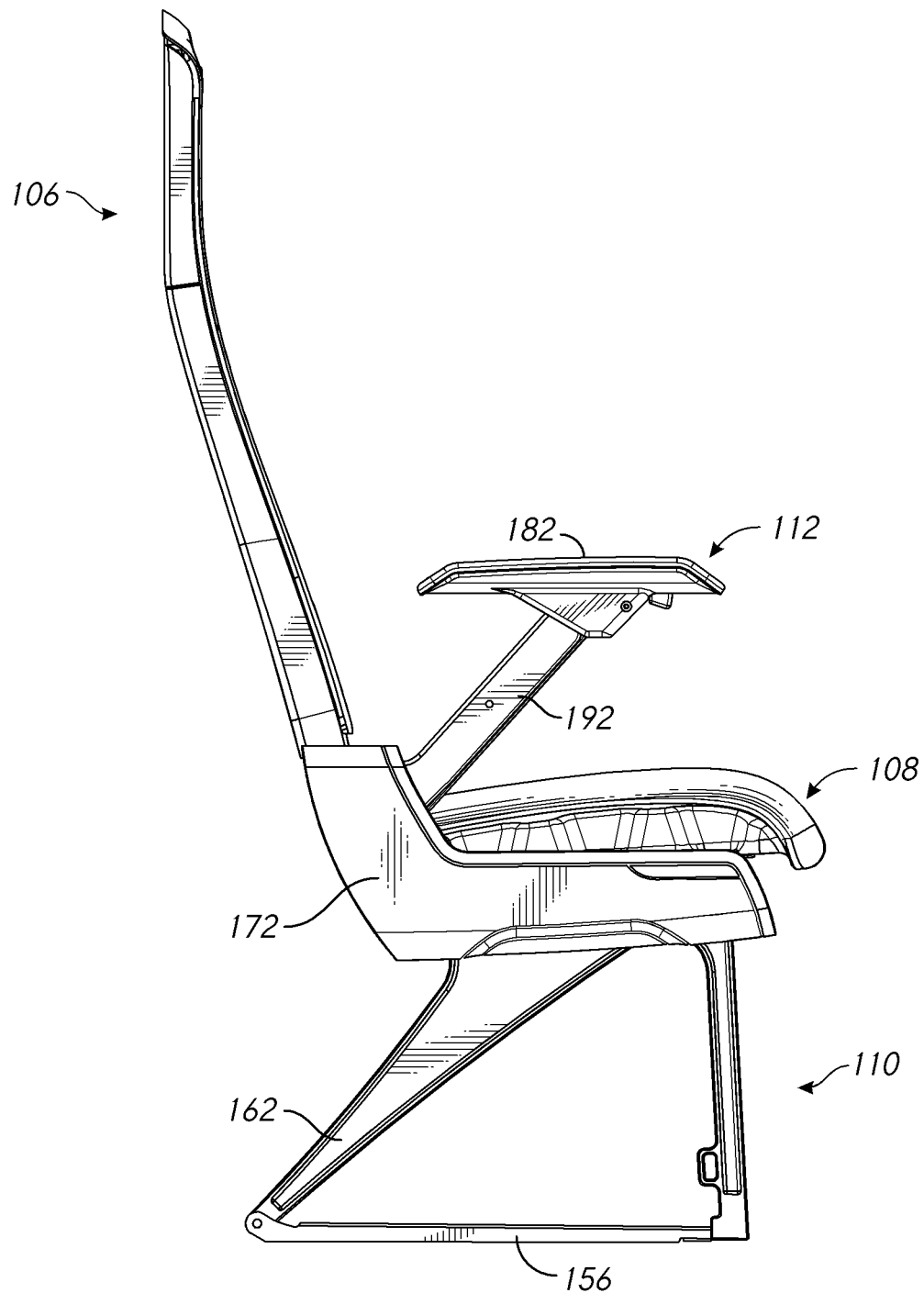
FIG. 4A is a side view of the aircraft seating assembly of FIG. 1A.
Figure 4C:
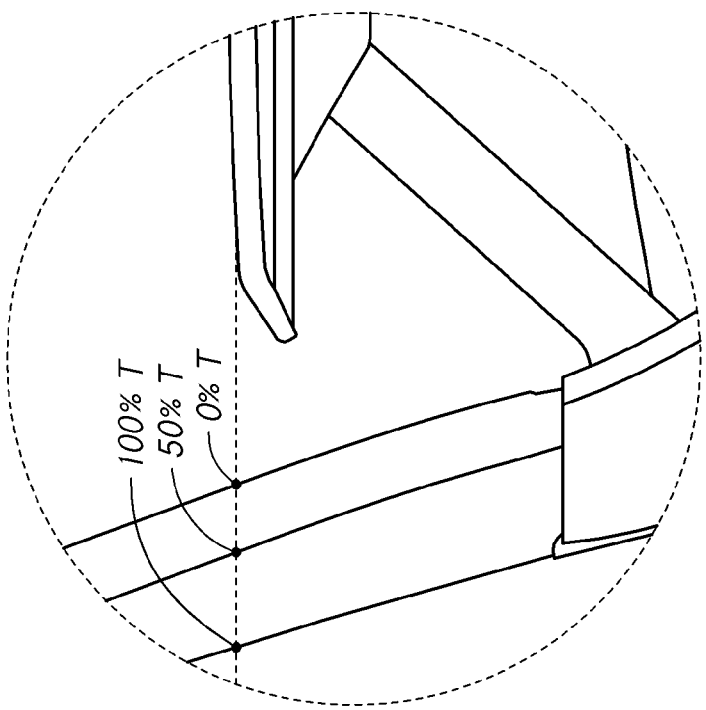
FIG. 4C is an enlarged view of a portion of the aircraft seating assembly as shown in FIG. 4B.
Figure 4B:
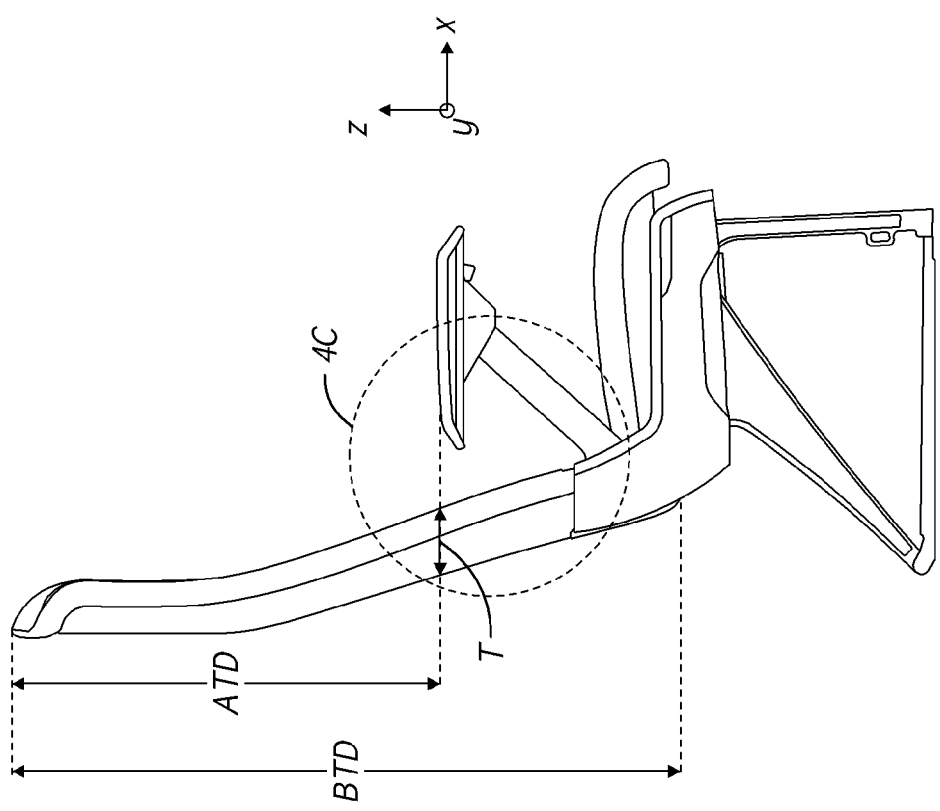
FIG. 4B is a side view of the aircraft seating assembly of FIG. 1A with cushioning.
Figure 5:
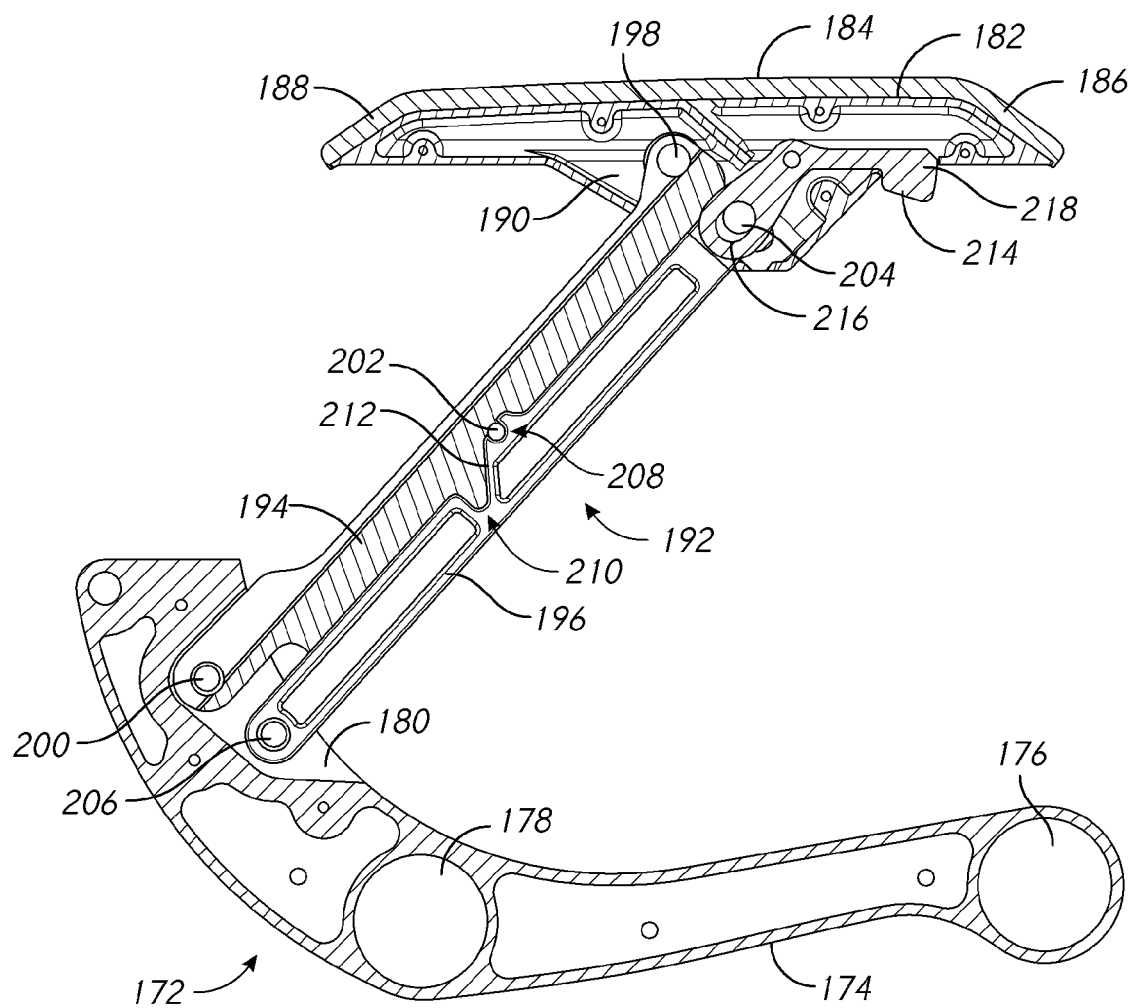
FIG. 5 is a side view of part of a connection frame and convertible support in a first position.
Figure 6:
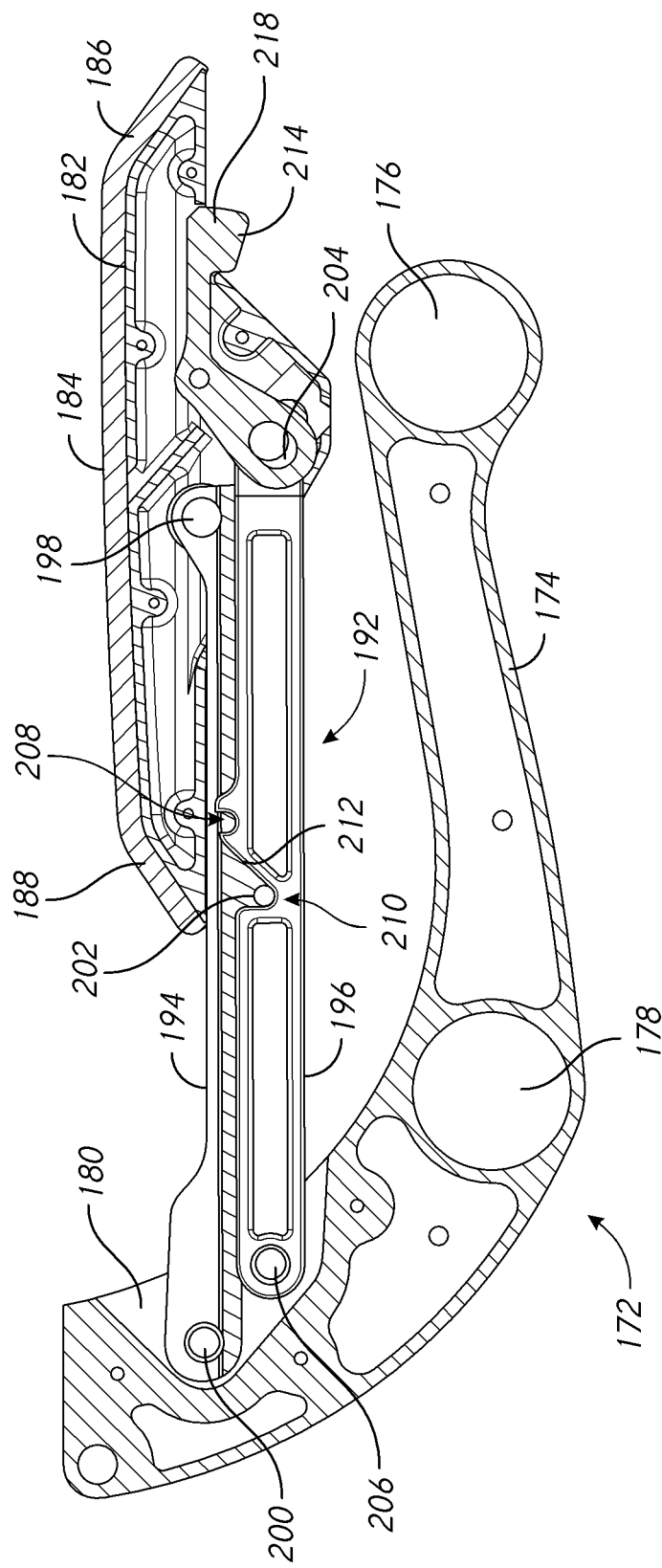
FIG. 6 is a side view of part of a connection frame and convertible support in a second position.

In some embodiments, such as that illustrated in FIGS. 3C and 3D, the shroud 126 itself can serve as the outer housing of the display monitor 127. Accordingly, the display screen 131 can fill the entirety of the aperture 128. This can be particularly advantageous to further increase the size of the display screen 131 relative to the width of the back support member 106. As shown in the illustrated embodiment, a protective shield 133, such as a cover manufactured from a translucent material such as plastic or glass, can be placed over the shroud 126, the display monitor 127, and/or the display screen 131 to protect these components from damage. As shown most clearly in FIG. 3D, there is a cavity 136 between the display monitor 127 and the contoured panel 115 of the frame 114. In some embodiments, wiring and other components of the display monitor 127 can be stored within this cavity 136. Moreover, wiring from the display monitor 127 can also be routed through portions of the back support member 106, such as the peripheral strut assembly 117, to other locations of the seats 102, 104 or off of the seat.

In some embodiments, the ratio of the seat width SW to the width of the aperture 128 and/or the cavity 136 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios. In some embodiments, the ratio of the seat width SW to the minimum width of the aperture 128 and/or the cavity 136 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios. In some embodiments, the ratio of the seat width SW to the maximum width of the aperture 128 and/or the cavity 136 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios. In some embodiments, the ratio of the seat width SW to the average width of the aperture 128 and/or the cavity 136 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios.

In some embodiments, the ratio of the width of the seat bottom to the width of the aperture 128 and/or the cavity 136 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios. In some embodiments, the ratio of the width of the seat bottom to the minimum width of the aperture 128 and/or the cavity 136 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios. In some embodiments, the ratio of the width of the seat bottom to the maximum width of t the aperture 128 and/or the cavity 136 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios. In some embodiments, the ratio of the width of the seat bottom to the average width of the aperture 128 and/or the cavity 136 is between 0.5 to 2.0, between 0.6 to 1.8, between 0.7 to 1.6, between 0.8 to 1.4, between 0.9 to 1.2, less than 1.3 to 1, any other ratio within these ranges, or any other ratios.

The back support member 106 may additionally include a tray 130 along its rear surface 124. The tray 130 may be designed such that it has a first configuration in which it is in a "stowed" position. In the "stowed" position, the tray can be relatively flush against the rear side for the back support such that it provides unobstructed access into and out of the aircraft seating assembly 100. The tray 130 may also be designed such that it has a second configuration in which it is in a "deployed" position. In the "deployed" position, the tray 130 may be in a generally horizontal orientation such that items may be placed upon the tray. The tray 130 can be locked in position using the locking mechanism 132 to reduce the likelihood of the tray 130 falling into the second position and potentially causing injury.

In some embodiments, the width of the tray 130 is between 70% to 120%, between 80% to 110%, or between 90% to 100% the minimum, maximum, and/or average width of the seat bottom 108. In some embodiments, the maximum width of the tray 130 is between 70% to 120%, between 80% to 110%, or between 90% to 100% the minimum, maximum, and/or average width of the seat bottom 108. In some embodiments, the minimum width of the tray 130 is between 70% to 120%, between 80% to 110%, or between 90% to 100% the minimum, maximum, and/or average width of the seat bottom 108. In some embodiments, the average width of the tray 130 is between 70% to 120%, between 80% to 110%, or between 90% to 100% the minimum, maximum, and/or average width of the seat bottom 108.

In some embodiments, the width of the tray 130 is between 50% to 150%, between 75% to 125%, or between 90% to 110% of the seat width SW defined below. In some embodiments, the minimum width of the tray 130 is between 50% to 150%, between 75% to 125%, or between 90% to 110% of the seat width SW defined below. In some embodiments, the maximum width of the tray 130 is between 50% to 150%, between 75% to 125%, or between 90% to 110% of the seat width SW defined below. In some embodiments, the average width of the tray 130 is between 50% to 150%, between 75% to 125%, or between 90% to 110% of the seat width SW defined below.

With continued reference to FIG. 3A, in the illustrated embodiment, the width of the frame 114 tapers when moving from the bottom side 122 to the top side 116 (i.e., the "height" of the back support member 106). In other embodiments, the width may remain constant throughout the entirety of the height of the frame 114. Furthermore, as illustrated most clearly in FIG. 3A, there is a minor gap 134 between the left side 118 of the frame 114 and the right side of the frame of an adjacent back support member. As shown in the illustrated embodiment, the gap 134 may vary in width throughout the height of the frame 114. In the illustrated embodiment, the gap 134 tapers outward when moving from the bottom side 122 to the top side 116 due to the inward tapering of the width of the frame 114. In some embodiments, the gap 134 may be approximately one inch or less. In other embodiments, the gap 134 may be approximately one-half an inch to a quarter of an inch. In yet other embodiments, the gap 134 may be substantially reduced such that no gap 134 exists. This may particularly be the case in instances where the back support member 106 additionally includes a cushion 300 surrounding the frame 114 such that the width of the back support member 106 is increased beyond the width of frame 114.

With reference to FIG. 3B, in the illustrated embodiment, the width of the cushion 300 tapers when moving from the bottom side to the top side 302 (i.e., the "height" of the cushion 300). In other embodiments, the width may remain constant throughout the entirety of the height of the cushion 300. Furthermore, as illustrated most clearly in FIG. 3B, there is a minor gap 308 between the left side 304 of the cushion 300 and the right side of the cushion of an adjacent back support member. As shown in the illustrated embodiment, the gap 308 may vary in width throughout the height of the cushion 300. In the illustrated embodiment, the gap 308 tapers outward when moving from the bottom side to the top side 302 due to the inward tapering of the width of the cushion 300, similar to that of frame 114. In some embodiments, the gap 308 may be approximately one inch or less. In other embodiments, the gap 308 may be approximately one-half an inch to a quarter of an inch. In yet other embodiments, the gap 308 may be substantially reduced such that no gap 134 exists.

This reduction in the size of the gap 134 between adjacent frames 114 and gap 308 between adjacent cushions 300 allows the width of the back support member 106 to be increased without increasing the side-to-side spacing of the seats 102, 104. For example, in some embodiments, the width of the back support member 106 is such that, throughout the height of the back support member 106, the gap 134, 308 is less wide than the convertible armrest 112. In other embodiments, the width of the back support member 106 is greater than the seat width SW defined as the shortest distance between two platform portions 182 of the convertible armrests 112 (see FIG. 2A). In some embodiments, the width of the back support member 106 may be greater than, or equal to, the width MPW between two midpoints of the platforms or platform portions 182 of the convertible armrests 112. In some embodiments, the width of the back support member 106 may be greater than the seat width SW plus the platform width PW of one or both of the platform portions 182. Platform width PW being defined as the distance between the two lateral edges of the platform 182. In some embodiments, the width of the back support member 106 may be greater than the seat width SW plus at least one-fourth, one-third, one-half, two-thirds, or three-quarters of the platform width PW of one or both of the platform portions 182. In some embodiments, the width of the back support member 106 may be greater than the seat width SW plus one-fourth to one, one-quarter to three-quarters, or one-third to two-thirds of the platform width PW of one or both platform portions 182. In yet other embodiments, the width of the back support member 106 extends beyond at least one-quarter of the platform width PW of each of the armrests. In yet other embodiments, the width may extend beyond at least one-third, one-half, two-thirds, and three-quarters of the platform width PW of each individual platform portions 182 defining the seat width SW for that seat. In some embodiments, the width of the back support member 106 above and adjacent to a horizontal plane 135 which contacts the uppermost point of the platform 182 in the deployed position is greater than the seat width SW.

In some embodiments, a width can be taken along a portion of the back support member 106. The width of the portion can be defined by the intersection of a vertical plane (i.e., the z-y plane) at a thickness T of the back support member 106, such as the frame 114 and/or the cushion 300, and a horizontal plane, such as plane 135. As shown most clearly in FIG. 4B and as one of ordinary skill in the art would understand, the thickness T of the back support member 106 is the distance between the front-most portion of the back support member 106 and the rear-most portion of the back support member 106 measured along a the horizontal plane. For purposes of this disclosure, 0% thickness T refers to the front-most portion of the back support member 106 and 100% thickness T refers to the rear-most portion of the back support member 106. In some embodiments, the portion of the back support member 106 can be any portion between 0% to 100% of the thickness T, any portion between 10% to 90% of the thickness T, any portion between 30% to 70% of the thickness T, any portion between 40% to 60% of the thickness T, the portion at 25% of the thickness T, the portion at 50% of the thickness T, the portion at 75% of the thickness T, and the portions at any other thickness T as herein disclosed.

In some embodiments, the width of the back support member 106, such as the frame 114 and/or the cushion 300, can be measured along any horizontal plane. In some embodiments, the width can be measured along a horizontal plane that intersects the bottom side 122 ("bottom-side plane"), a horizontal plane that intersects the top side 116 ("top-side plane"), and any other horizontal plane between these two planes. The bottom-side plane and the top-side plane are separated by a distance BTD. For example, the horizontal plane can be located between the bottom-side plane and the top-side plane at a position between 0% to 100% of the distance BTD from the bottom-side plane, at a position between 10% to 90% of the distance BTD from the bottom-side plane, at a position between 20% to 80% of the distance BTD from the bottom-side plane, at a position between 30% to 70% of the distance BTD from the bottom-side plane, at a position between 40% to 60% of the distance BTD from the bottom-side plane, at a position 25% of the distance BTD from the bottom-side plane, at a position 50% of the distance BTD from the bottom-side plane, at a position 75% of the distance BTD from the bottom-side plane, or at any other position within this range.

In some embodiments, the width can be measured along plane 135, the top-side plane, and any other horizontal plane between these two planes. Plane 135 and the top-side plane are separated by a distance ATD. For example, the horizontal plane can be located between plane 135 and the top-side plane at a position between 0% to 100% of the distance ATD from plane 135, at a position between 10% to 90% of the distance ATD from plane 135, at a position between 20% to 80% of the distance ATD from plane 135, at a position between 30% to 70% of the distance ATD from plane 135, at a position between 40% to 60% of the distance ATD from plane 135, at a position 25% of the distance ATD from plane 135, at a position 50% of the distance ATD from plane 135, at a position 75% of the distance ATD from plane 135, or at any other position within this range.

As should be appreciated in view of the disclosure above regarding tapering of the back support member 106, the width of the back support member 106 can vary depending on the chosen plane and the overall shape of the back support member 106. For example, in embodiments where the back support member 106 tapers inwardly from the bottom side 122 to the top side 116, the width of the back support member 106 might decrease from the bottom side 122 to the top side 116. Of course, other types of back support member 106 designs can be chosen and the width can remain constant or increase from the bottom side 122 to the top side 116.

As one of ordinary skill in the art would understand, there would thus exist a minimum width and a maximum width for the back support member 106 between the bottom side 122 and the top side 116. Moreover, as one of ordinary skill in the art would understand, the average width of the back support member 106 is the sum of the widths taken at equally spaced apart distances, divided by the number of measurements taken. Of course, for a more precise result, the average width of the back support member 106 would be the integral of the widths divided by the length over which that integral was taken.

In some embodiments, the minimum, maximum and average widths can be taken between the bottom-side plane and the top-side plane. In some embodiments, the minimum, maximum and average widths can taken between plane 135 and the top side plane. In some embodiments, the minimum, maximum and average widths can taken between any planes between the bottom-side plane and the top-side plane. Positions of such planes have been previously discussed.

In other embodiments, the minimum, maximum and/or average widths of the back support member 106 is greater than the seat width SW. In some embodiments, the minimum, maximum and/or average widths of the back support member 106 may be greater than, or equal to, the width MPW. In some embodiments, the minimum, maximum and/or average widths of the back support member 106 may be greater than the seat width SW plus the platform width PW of one or both of the platform portions 182. In some embodiments, the minimum, maximum and/or average widths of the back support member 106 may be greater than the seat width SW plus at least one-fourth, one-third, one-half, two-thirds, or three-quarters of the platform width PW of one or both of the platform portions 182. In some embodiments, the minimum, maximum and/or average widths of the back support member 106 may be greater than the seat width SW plus one-fourth to one, one-quarter to three-quarters, or one-third to two-thirds of the platform width PW of one or both platform portions 182. In yet other embodiments, the minimum, maximum and/or average widths of the back support member 106 extends beyond at least one-quarter of the platform width PW of each of the armrests. In yet other embodiments, the minimum, maximum and/or average widths may extend beyond at least one-third, one-half, two-thirds, and three-quarters of the platform width PW of each individual platform portions 182 defining the seat width SW for that seat. In some embodiments, the minimum, maximum and/or average widths of the back support member 106 above and adjacent to a horizontal plane 135 which contacts the uppermost point of the platform 182 in the deployed position is greater than the seat width SW.

As such, this provides significant advantages such as, but not limited to, allowing for the use of a larger display monitor such that the seated passenger is given an enhanced entertainment experience, allowing for the use a larger tray table so that there exists more usable space on the tray, and providing greater coverage over the back of a seated passenger which can potentially increase comfort while seated.

The back support member 106 may include mounting mechanisms located on the frame 114. In some embodiments, these mounting mechanisms can be used to mount the back support member 106 to the seat member 108 or the connection frame 110. In some embodiments, the back support member 106 may be rotatably mounted such that the back support member 106 can recline during operation. Additionally, in some embodiments, the front surface 129 of the back support member 106 may have a smaller width as compared to the rear surface 124 such that, when placed adjacent to each other, a recess is formed between the adjacent back support portions. In such embodiments, the recess may be sized to allow an armrest to fit therein.

With reference back to FIG. 1A, the seat bottom 108 can include a frame 138. In the illustrated embodiment, the frame 138 includes both a top frame 140 which may serve as a seating surface and an under frame 142 which can be used to mount the seat bottom 108 to the connection frame 110. In some embodiments, the top frame 140 may be designed to contour to the general shape of a seated passenger. As such, in the illustrated embodiment, the top frame 140 curves downward towards a front end 144 of the frame 138. Since the under frame 142 can be used to mount the seat bottom 108 to the connection frame 110 or some other component of the aircraft seating assembly 100, the under frame 142 may include apertures for allowing fasteners, such as screws, to pass therethrough. The under frame 142 may additionally include other fastening or mounting means to allow the under frame 142 to be mounted or fastened to another component.

The seat bottom can be designed to support the weight of a seated passenger. Additionally, in some embodiments, the seat member 108 is designed to withstand forces generated on a passenger's body during the normal course of a typical flight but also the more substantial forces which may occur as a result of emergencies. The frame 138 can be constructed using lightweight, but high-strength materials, such as composites including fiberglass and carbon fiber, polymers, and any other materials known in the art. In other embodiments, the frame 138 may include a different shaped top frame 140 and under frame 142.

The seat bottom 108 may have a front side 144, a first or left side 146, a second or right side 148, and a rear side 150 (shown in FIG. 3A) extending around the periphery of the seat bottom 108. The seat bottom 108 may additionally include a top surface 152 facing towards the seated passenger and an under surface (not shown) opposite the top surface 152. In some embodiments, the top surface 152 may have a cushion attached on its face such that a passenger need not directly contact the top surface 152 which may be made of an inflexible material. The cushion could be made of a more flexible material such as foam or rubber. This cushion could therefore reduce shocks transmitted to the passenger's body. In other embodiments, the cushion may additionally cover other parts of the seat bottom 108. It should be appreciated that, in some embodiments, the seat bottom 108, such as the top frame 140 may be made of a sufficiently soft material that no cushion is used.

As illustrated more clearly in FIG. 2A, in some embodiments, there is a gap 154 between the left side 146 of the seat bottom 108 and a right side of an adjacent seat bottom. This gap 154 is generally larger than the gap 134 between adjacent back support members 106. The gap 154 can be dimensioned such that the convertible armrest 112 can fit within the gap 154 when in a "stowed" position. As such, the seat bottom 108 may have a width less than the width of the back support member 106.

With reference back to FIG. 1A, the connection frame 110 can be designed to serve as the connection mechanism for the components of the aircraft seating assembly 100 and allow these components to be attached to the cabin of the aircraft. In the illustrated embodiment, the connection member 110 has floor beams 156 which are elongate beams having a front end 158 and a rear end 160. The floor beams 156 can be designed to be mounted along the floor of an aircraft using the aircraft's seat assembly mounts. As such, in some embodiments, since many aircraft use a seat rail system as a seat assembly mount, the floor beams 156 can be designed to attach to a seat rail. In some embodiments, the floor beams 156 may include apertures for allowing a fastener to pass therethrough thereby allowing the floor beams 156 to be directly fastened to the floor of the cabin. It should be appreciated that multiple types of mounting mechanisms can be used and that the types of fastening mechanisms should not be limited to the above embodiments. Rather, all fastening mechanisms known by a person of ordinary skill in the art may also be used to attach the floor beams 156 to the floor of an aircraft.

In some embodiments, the connection frame 110 includes struts 162 are attached to the floor beams 156. In the illustrated embodiment, the strut 162 is an integral unit having two legs, the bottom portion of the first leg being attached to the front end 158 of the floor beam 156 and the bottom portion of the second leg being attached to the rear end 160 of the floor beam 156. However, it should be appreciated that one or more legs could also be used for the struts 162 depending on the required structural requirements for the struts 162. Additionally, the strut may additionally include mounting mechanisms along its top portion for allowing a support connector 164 to be mounted thereon. In the illustrated embodiment, the mounting mechanisms are apertures sized and shaped to allow support connectors 164 pass therethrough. This mounting mechanism allows the struts 162 and floor beams 156 to be moved relative to the support connectors 164. Since different aircraft, especially those manufactured by different companies, may have different seat assembly mounting points, it is advantageous to have the struts 162 and floor beams 156 adjustable such that the aircraft seating assembly 100 can be used in multiple types of aircraft.

With reference back to FIGS. 2A, 2B 3A and 3B, the struts 162 are designed to raise the seats off the floor surface and can be designed such that they are able to support a significant amount of forces. For example, the struts 162 may be designed such that it can support the weight of passengers, the weight of the seat assembly 100 attached thereto, and additionally withstand significant forces exerted upon the passengers during emergency situations, without buckling or failing. In some embodiments, the legs of the struts 162 have sufficient height such that a passenger may place items, such as carry-on luggage, beneath the seat. Additionally, in some embodiments, a cross-beam 166 may be mounted onto the front legs of the struts 162 to provide additional structural integrity and, in some instances, to reduce the likelihood that items stowed underneath the seat will move beyond the front legs of the struts 162. Such a situation can potentially cause injury to other passengers.

In some embodiments, support connectors 164 may be mounted to the struts 162. In the illustrated embodiment, support connectors 164 include a first and second connector 168, 170 in the form of elongate, hollow tubes having a circular cross-section. The hollow design may advantageously reduce the weight of the support connectors 164 while still maintaining significant structural support. In other embodiments, the support connectors 164 may take the form of other shapes. Furthermore, fewer or greater numbers of connectors may be used as required by structural requirements.

The support connectors 164 are designed to serve as a connection mechanism for the multiple components of the aircraft seating assembly 100. As such, the support connectors 164 may accept multiple types of mounting or fastening means. For example, in the illustrated embodiment, mounting bars (not shown) are mounted to both the first and second connectors 168, 170 to serve as a mounting mechanism for the under frame 142 of the seat bottom 108. Additional connectors may also be used to mount the back support member 106 to the connection frame 110. In the illustrated embodiment, the back support member 110 is mounted to the second connector 170. Other components may additionally be mounted or fastened to the support connectors 164 such as, but not limited to, the convertible armrests 112. However, it should be appreciated that not all components need to be mounted or fastened to the support connectors 164. In some instances, no component is mounted or fastened to the support connectors 164.

With reference to FIGS. 4A, 4B, 5 and 6 which are side views of the portions of the connection frame 110 and the convertible armrest 112, the connection frame 110 may also include attachment frames 172 which are designed to serve as an additional mounting point for components of the aircraft seating assembly 100. In the illustrated embodiment, the attachment frame 172 has a curved body portion 174 having two apertures 176, 178 sized and shaped to allow the first and second connectors 168, 170 to pass therethrough. Additionally, the attachment frame 172 may have a recessed portion forming a housing area 180 designed to receive a part of the convertible armrest 112. As such, the housing area 180 includes apertures which allow a fastener to pass therethrough. Additionally, the attachment frames 172 may include additional mounted mechanisms for other components of the aircraft seating assembly 100. In the illustrated embodiment, the back support member 106 is also mounted to the attachment frames 172. It should be noted that, the attachment frames 172 may also serve as a spacing element between the multiple seats 102, 104. This also requires that the width of the seat bottom 108 be slightly narrower to accommodate the width of the attachment frames 172. It should be appreciated that, although the attachment frame 172 is illustrated as being separate from the struts 162, in some embodiments, it is possible that the attachment frame 172 and the struts 162 can form an integral unit. In some embodiments, including the embodiment where the attachment frame 172 and struts 162 form an integral unit, the attachment frame 172 may be centered over the struts 162. In other embodiments, the attachment frame 172 may be offset slightly from the struts 162.

The convertible armrest 112 is designed to be moved to different positions. In some embodiments, such as that illustrated in FIGS. 5 and 6, the convertible armrest 112 is designed such that it has a first, or "deployed," position in which the convertible armrest 112 can be used by a seated passenger to support an arm and a second, or a "stowed," position, in which the convertible armrest 112 can provide substantially unhindered side or lateral access into the aircraft seating assembly 100. Due to industry regulations, the convertible armrest 112 must be sufficiently designed such that it can meet certain performance standards. For example, the convertible armrest 112, while in the first position, may be designed to support at least a three-hundred pound force applied in the vertical downward position. Additionally, the convertible armrest 112, while in the second position, must be positioned such that it does not interfere with ingress and egress through the side of the aircraft seating assembly 100. For example, in the illustrated embodiment, when the convertible armrest 112 is in the second position, the platform 182 is positioned such that the upper surface 184 is generally flush with the top surface 152 of the seat bottom 108. It should be appreciated that, depending on the shape of the convertible armrest 112 and the shape of the seat bottom 108, the upper surface 184 of the platform 182 may be slightly above the top surface 152 of the seat bottom 108. It is also possible that the upper surface 184 of the platform 182 may be below the top surface 152 of the seat bottom 108. Moreover, as should be appreciated by one of ordinary skill, because this folds toward and adjacent to the seat bottom 108, a passenger can relatively easily put the armrest into the "stowed" position which allows relatively unimpeded access across the seat. Moreover, positioning adjacent to the seat bottom 108 reduces the likelihood that other items in the cabin prevent conversion of the convertible armrest 112 from "deployed" position to the "stowed" position. Accordingly, in an emergency situation, there is a reduced likelihood that a passenger will only partially convert the armrest from a "deployed" position to a "stowed" position.

This is particularly advantageous as compared to armrests which requires multiple folding steps or which fold below the seat 108. Such armrests are more likely to be improperly handled by a passenger thus more likely resulting in only partial conversion of the armrest. Moreover, armrests which fold below the seat bottom 108 are more likely to be impeded by baggage stored underneath the seat. Accordingly, such armrests are more likely to result in impeded access out of the seat.

The platform 182 can be shaped such that the upper surface 184 is relatively flat such that a passenger may comfortably rest his or her arm upon the platform 182. The middle of this distance defining the midpoint of the convertible armrest 112. Generally, the platform 182 is designed such that the platform's width PW is sufficiently wide such that the platform 182 provides sufficient coverage to support an arm. A person of ordinary skill in the art would understand that, if the platform 182 is too narrow, the platform 182 may cause discomfort due to high pressures. Additionally, the front 186 and rear 188 of the platform 182 as illustrated, may be tapered downward. In some embodiments, a cushioning material, such as rubber or foam, may be attached to the platform in order to increase comfort by providing a cushion between the platform 182 and the passenger's arm. In other embodiments, the platform 182 itself can be manufactured from a softer material such as rubber.

The bottom portion of the platform can include a slot 190 in which the base or mount portion 192 can be received. In the illustrated embodiment, the base 192 includes both an outer beam 194 and an inner beam 196. The outer beam 194 can be an elongate member having a "C"-shaped cross-sectional area such that the inner beam 196 may be covered, at least in part, by the outer beam 194 during normal operation. This structure could provide an advantage in that it reduces the likelihood that, during operation, a passenger will accidentally injure him or herself due to having an appendage pinched in the base 192. That is, this structure could reduce the number of pinch-points along the base 192. The outer beam 194 has a first or front end 198 with a mounting mechanism such as an aperture and a second or rear end 200 with a similar mounting mechanism. Additionally, the outer beam 194 may additionally include a retention mechanism 202, such as a retention pin. In the illustrated embodiment, the retention mechanism 202 is located approximately between the front and rear ends 198, 200. The retention mechanism 202 can be designed to lock the convertible armrest 112 in a specific position.

The inner beam 196 may be an elongate member having a first or front end 204 having a mounting mechanism such as an aperture and a second or rear end 206 having a similar mounting mechanism. Additionally, the inner beam 196 may include a support detent 208 located at some point along the length of the inner beam 196. In the illustrated embodiment, the support detent 208 operates together with the retention mechanism 202 to lock the convertible armrest 112 in the first position. The depth of the support detent 208 can be chosen based on the requisite amount of structural strength required for the convertible armrest 112 while in the first position. The inner beam 196 may additionally include a passage detent 210 located rearward of the support detent 208. In the illustrated embodiment, the passage detent 210 allows the convertible armrest 112 to be placed in a second position (see FIG. 7) without any interference with the retention mechanism 202. The inner beam 196 may additionally include a ramp 212 between the support detent 208 and the passage detent 210 which could be designed to allow the convertible armrest 112 to be converted from the second position to the first position without having to manually depress any switches.

In the illustrated embodiment, the base 192 is in the form of a four-bar linkage system. As such, the platform 182 is rotatably mounted with respect to the front ends 198, 204 of the outer beam 194 and inner beam 196. Additionally the rear ends 200, 206 of the outer beam 194 and inner beam 196 are rotatably mounted with respect to the attachment frame 172. This rotatable mounting can be achieved through the use of pin-hinges or with screws and bearings through mounting mechanisms located on the ends of the outer beam 194 and inner beam 196. During operation, the convertible armrest 112 pivots downward towards the seats 108. However, due to the four-bar linkage system, the outer beam 194 and inner beam 196 do not maintain their alignment. As such, as the convertible armrest 112 pivots downward, the inner beam 196 "translates" forward with respect to the outer beam 194. As such, the retention mechanism 202 in the second position is located rearward along the inner beam 196 as compared to the retention mechanism 202 in the first position.

As discussed above, due to the support detent 208 the convertible armrest 112 would be unable to pivot unless the retention mechanism 202 is released or the inner beam 196 fails. In order to release the retention mechanism 202 from the support detent 208, a release switch 214 may be used. In the illustrated embodiment, the front end 204 of the inner beam 196 is attached to the rear end 216 of the release switch 214. Since the release switch 214 is rotatably mounted with respect to the platform 182, when the front end 218 is depressed, the inner beam 196 is pivoted such that the support detent 208 no longer receives the retention mechanism 202. As such, the convertible armrest 112 may freely pivot downwards towards the second position. In some embodiments, the convertible armrest 112 does not extend below the bottom of the seat.

It should be appreciated that, in some embodiments, the convertible armrest 112 pivot upwards from a first position to the second position. In such embodiments, a bottom most surface of the convertible armrest 112 may be generally flush with the front surface 129 of the back support member 106. It should be appreciated that, depending on the shape of the convertible armrest 112 and the shape of the back support member 106, the bottom most surface of the convertible armrest 112 may be slightly forward of the front surface 129 of the back support member 106. It is also possible that the bottom most surface of the convertible armrest 112 may be rearward of the front surface 129 of the back support member 106. This embodiment may additionally be combined with the back support with a recess.

While certain embodiments of the disclosure have been described, these embodiments have been presented by way of example only, and are not intended to limit the scope of the disclosure. Indeed, the novel assemblies and devices described herein may be embodied in a variety of other forms. For example, the convertible armrests described above can be utilized for other purposes or may pivot in an alternative direction. Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Furthermore, various omissions, substitutions and changes in the form of the assemblies and devices described herein may be made without departing from the spirit of the disclosure.

Conditional language, for example, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. An aircraft seating assembly for installation in an aircraft, the assembly comprising:
   a back support having a front side, a rear side, a first side and a second side, comprising a back support frame and a back support cushion attached to the back support frame;
   a seat bottom having a top surface, an under surface, a first side and a second side, comprising a seat frame and a seat cushion attached to the seat frame; and
   a plurality of armrests, each armrest comprising a mount portion and a platform portion supported by the mount portion, the platform portion defining an upper surface for supporting an arm of a passenger and wherein the mount portion is supported by at least one of the back support frame, the seat frame, and a connection frame;
   wherein at least one of the plurality of armrests is convertible, by pivoting, from a first position wherein the upper surface of the platform portion is positioned to support an arm of a seated passenger to a second position in which the armrest is configured to allow unhindered entry laterally past the armrest; and
   wherein a width of the back support above and adjacent to a plane defined by the armrest in the second position is greater than a seat width, the seat width defined as the minimum distance between two of the plurality of platform portions which are positioned on opposite sides of the seat bottom.

2. The aircraft seating assembly of claim 1, wherein the width of the back support is equal to the width of the back support frame above and adjacent to a plane defined by one of the plurality of armrests in the second position.

3. The aircraft seating assembly of claim 1, wherein the width of the back support is equal to the width of the back support cushion above and adjacent to a plane defined by one of the plurality of armrests in the second position.

4. The aircraft seating assembly of claim 1, wherein the maximum width of the back support is greater than the seat width.

5. The aircraft seating assembly of claim 1, wherein the minimum width of the back support is greater than the seat width.

6. The aircraft seating assembly of claim 1, wherein the average width of the back support is greater than the seat width.

7. The aircraft seating assembly of claim 1, wherein the entire width of the back support above and adjacent to a plane defined by one of the plurality of armrests in the second position is greater than the seat width.

8. The aircraft seating assembly of claim 1, wherein the width of the back support is greater than the seat width plus at least one-half of a platform width, defined as the width of the platform portion, of a widest one of the plurality of armrests.

9. The aircraft seating assembly of claim 1, wherein the width of the back support is greater than the seat width plus at least two-thirds of a platform width, defined as the width of the platform portion, of a widest one of the plurality of armrests.

10. The aircraft seating assembly of claim 1, wherein the width of the back support is greater than the seat width plus one-quarter to three-fourths of a platform width, defined as the width of the platform portion, of a widest one of the plurality of armrests.

11. The aircraft seating assembly of claim 1, wherein a front-most portion of the back support has a width above and adjacent to a plane defined by one of the plurality of armrests in the second position greater than the seat width.

12. The aircraft seating assembly of claim 1, wherein a front-most portion of the back support has a width above and adjacent to a plane defined one of the plurality of armrests in the second position greater than a width of the seat bottom.

13. The aircraft seating assembly of claim 1, wherein a portion of the back support defined by an intersection of a vertical plane spaced one-quarter of the thickness of the back support from the front side of the back support and a horizontal plane defined by one of the plurality of armrests in the second position is greater than the seat width.

14. The aircraft seating assembly of claim 1, wherein a portion of the back support defined by an intersection of a vertical plane spaced one-quarter of the thickness of the back support from the front side of the back support and a horizontal plane defined by one of the plurality of armrests in the second position is greater than a width of the seat bottom.

15. The aircraft seating assembly of claim 1, wherein a portion of the back support defined by an intersection of a vertical plane spaced one-half of the thickness of the back support from the front side of the back support and a horizontal plane defined by the armrest in the second position is greater than the seat width.

16. The aircraft seating assembly of claim 1, wherein a portion of the back support defined by an intersection of a vertical plane spaced one-half of the thickness of the back support from the front side of the back support and a horizontal plane defined by one of the plurality of armrests in the second position is greater than a width of the seat bottom.

17. The aircraft seating assembly of claim 1, wherein a portion of the back support defined by an intersection of a vertical plane spaced three-quarters of the thickness of the back support from the front side of the back support and a horizontal plane defined by one of the plurality of armrests in the second position is greater than the seat width.

18. The aircraft seating assembly of claim 1, wherein a portion of the back support defined by an intersection of a vertical plane spaced three-quarters of the thickness of the back support from the front side of the back support and a horizontal plane defined by one of the plurality of armrests in the second position is greater than a width of the seat bottom.

19. The aircraft seating assembly of claim 1, wherein a portion of the back support is measured along a rear-most portion of the back support.

20. The aircraft seating assembly of claim 1, wherein the mount portion of at least one of the plurality of armrests has a first end and a second end and is rotatably mounted with respect to at least one of the back support frame, the seat frame, or the connection frame.

21. The aircraft seating assembly of claim 1, wherein at least one of the plurality of armrests rotates downward during conversion from the first position to the second position.

22. The aircraft seating assembly of claim 1, wherein in the second position, the top surface of the platform is generally flush with or below the top surface of the seat bottom.

23. The aircraft seating assembly of claim 1, wherein the mount portion is comprised of an outer beam and an inner beam both having first and second ends, the first ends of both beams rotatably mounted with respect to at least one of the back support frame, the seat frame, or the connection frame and the platform being rotatably mounted with respect to the second ends of both beams.

24. The aircraft seating assembly of claim 23, further comprising a retention mechanism configured to selectably prevent pivoting of the outer beam and the inner beam.

25. The aircraft seating assembly of claim 24, wherein the retention mechanism comprises a pin running laterally through the outer beam and a detent location on the periphery of the inner beam, wherein in a first position, the pin is received within the detent such that the armrest is locked in the first position.

26. The aircraft seating assembly of claim 25, further comprising a release switch configured to move the inner beam such that the pin is no longer received within the detent.

27. The aircraft seating assembly of claim 1, wherein the rear side of the back support has a tray which has a first position in which the tray is relatively flush against the rear side of the back support and a second position in which the tray is generally horizontal.

28. The aircraft seating assembly of claim 27, wherein the tray has a width of at least three-quarters the seat width.

29. The aircraft seating assembly of claim 27, wherein the ratio of the seat width to the width of the tray is at least 1.3 to 1.

30. The aircraft seating assembly of claim 27, wherein the ratio of a width of the seat bottom to the width of the tray is at least 1.3 to 1.

31. The aircraft seating assembly of claim 27, wherein the tray has a width about equal to the seat width.

32. The aircraft seating assembly of claim 1, wherein the rear side of the back support has a cavity with an aperture.

33. The aircraft seating assembly of claim 32, wherein the aperture has a width of at least three-quarters the seat width.

34. The aircraft seating assembly of claim 32, wherein the ratio of the seat width to the width of the aperture is less than 1.3 to 1.

35. The aircraft seating assembly of claim 32, wherein the ratio of a width of the seat bottom to the width of the aperture is less than 1.3 to 1.

36. The aircraft seating assembly of claim 32, wherein the ratio of the seat width to the width of the cavity is less than 1.3 to 1.

37. The aircraft seating assembly of claim 32, wherein the ratio of a width of the seat bottom to the width of the cavity is less than 1.3 to 1.

38. The aircraft seating assembly of claim 32, further comprising a monitor received within the cavity, the monitor comprising a display screen.

39. The aircraft seating assembly of claim 38, wherein the display screen has a width of at least three-quarters the seat width.

40. The aircraft seating assembly of claim 38, wherein the ratio of the seat width to the width of the display screen is less than 1.3 to 1.

41. The aircraft seating assembly of claim 38, wherein the ratio of a width of the seat bottom to the width of the display screen is less than 1.3 to 1.

42. An aircraft seating assembly for installation in an aircraft, the assembly comprising:
   a back support having a front side, a rear side a first side and second side comprising a back support frame and a back support cushion attached to the back support frame;
   a seat bottom having a top surface, an under surface, a first side and a second side, comprising a seat frame and a seat cushion attached to the seat frame; and
   an armrest comprising a mount portion and a platform portion supported by the mount portion, the platform portion defining an upper surface for supporting an arm of a passenger, wherein the mount portion is supported by at least one of the back support frame, the seat frame, and a connection frame;
   wherein the armrest is convertible, without extending below the bottom of the seat bottom, from a first position wherein the upper surface of the platform is positioned to support an arm of a seated passenger to a second position in which the armrest is configured to allow unhindered entry laterally past the armrest; and
   wherein the width of the back support above and adjacent to a plane defined by the armrest in the second position is greater than the width of the seat bottom.

43. An aircraft seating assembly for installation in an aircraft, the assembly comprising:
   a back support having a front side, a rear side, a first side and a second side, comprising:
      a back support frame configured to maintain structural integrity and resist impact forces; and
      a back support cushion, attached to the back support frame, configured to provide a cushion between a seated passenger and the back support frame;
   a seat bottom having a top surface, an under surface, a first side and a second side, comprising:
      a seat frame configured to maintain structural integrity and to resist impact forces; and
      a seat cushion, attached to the seat frame, configured to provide a cushion between a seated passenger and the seat frame; and
   a plurality of armrests, each armrest comprising:
      a mount portion;
      a platform portion supported by said mount portion, said platform portion defining an upper surface for supporting an arm of a passenger;
   wherein the mount portion is supported by at least one of the back support frame, the seat frame, or a connection frame;
   wherein at least one of the plurality of armrests is convertible, by pivoting, from a first position wherein the upper surface of the platform portion is positioned to support an arm of a seated passenger to a second position in which the armrest is configured to allow unhindered entry laterally past the armrest; and
   wherein the width of the back support above and adjacent to a plane defined by the armrest in the second position is greater than a seat width defined as the minimum distance between two of the plurality of platform portions which are positioned on opposite sides of the seat bottom.

44. An aircraft seating assembly for installation in an aircraft, the assembly comprising:
   a back support having a front side, a rear side a first side and second side comprising:
      a back support frame configured to maintain structural integrity and resist impact forces; and
      a back support cushion, attached to the back support frame, configured to provide a cushion between a seated passenger and the back support frame;
   a seat bottom having a top surface, an under surface, a first side and a second side, comprising:
      a seat frame configured to maintain structural integrity and to resist impact forces; and
      a seat cushion, attached to the seat frame, configured to provide a cushion between a seated passenger and the seat frame; and
   an armrest comprising:
      a mount portion;
      a platform portion supported by said mount portion, said platform portion defining an upper surface for supporting an arm of a passenger;
   wherein the mount portion is supported by at least one of the back support frame, the seat frame, or a connection frame;
   wherein the armrest is convertible, without extending below the bottom of the seat bottom, from a first position wherein the upper surface of the platform is positioned to support an arm of a seated passenger to a second position in which the armrest is configured to allow unhindered entry laterally past the armrest; and
   wherein the width of the back support above and adjacent to a plane defined by the armrest in the second position is greater than the width of the seat bottom.

\* \* \* \* \*

UNITED STATES PATENT AND TRADEMARK OFFICE
CERTIFICATE OF CORRECTION

| | | |
|---|---|---|
| PATENT NO. | : 9,630,717 B2 | Page 1 of 1 |
| APPLICATION NO. | : 14/245892 | |
| DATED | : April 25, 2017 | |
| INVENTOR(S) | : Jeremy Wilkens | |

It is certified that error appears in the above-identified patent and that said Letters Patent is hereby corrected as shown below:

In the Specification

In Column 8 at Line 58, Change "a the" to --a--.

In the Claims

In Column 19 at Line 9, In Claim 42, after "side" insert --,--. (First Occurrence)

In Column 19 at Line 10, In Claim 42, after "side" insert --,--.

In Column 20 at Line 19, In Claim 44, after "side" insert --,--. (First Occurrence)

In Column 20 at Line 20, In Claim 44, after "side" insert --,--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*